United States Patent
Smith et al.

(10) Patent No.: US 10,561,972 B2
(45) Date of Patent: Feb. 18, 2020

(54) FILTER MEDIA INCLUDING A WAVED FILTRATION LAYER

(71) Applicant: Hollingsworth & Vose Company, East Walpole, MA (US)

(72) Inventors: Bruce Smith, Copper Hill, VA (US); David T. Healey, Bellingham, MA (US); Ingrid Rückert, Hatzfeld (DE); Siqiang Zhu, Christiansburg, VA (US)

(73) Assignee: Hollingsworth & Vose Company, East Walpole, MA (US)

( * ) Notice: Subject to any disclaimer, the term of this patent is extended or adjusted under 35 U.S.C. 154(b) by 139 days.

(21) Appl. No.: 15/466,799

(22) Filed: Mar. 22, 2017

(65) Prior Publication Data
US 2017/0312673 A1    Nov. 2, 2017

Related U.S. Application Data

(63) Continuation-in-part of application No. 14/858,398, filed on Sep. 18, 2015.

(51) Int. Cl.
*B01D 39/18* (2006.01)
*B01D 39/20* (2006.01)
(Continued)

(52) U.S. Cl.
CPC ............ *B01D 39/18* (2013.01); *A62B 23/025* (2013.01); *B01D 39/1623* (2013.01);
(Continued)

(58) Field of Classification Search
CPC ................ B01D 39/1623; B01D 39/18; B01D 39/2017; B01D 46/10; B01D 46/521;
(Continued)

(56) References Cited

U.S. PATENT DOCUMENTS 2,409,066 A    10/1946 Powell et al.
2,500,690 A    3/1950 Lannan
(Continued)

FOREIGN PATENT DOCUMENTS

DE    196 13 463 A1    10/1997
GB    2 145 126 A    3/1985
(Continued)

OTHER PUBLICATIONS

International Search Report and Written Opinion for International Application No. PCT/US2016/052070 dated Jan. 25, 2017.
(Continued)

*Primary Examiner* — Jason M Greene
(74) *Attorney, Agent, or Firm* — Wolf, Greenfield & Sacks, P.C.

(57) ABSTRACT

Filter media including a waved filtration layer are described herein. The filtration layer may be held in a waved configuration by a support layer. In some cases, the filtration layer may have a combination of characteristics (e.g., mean flow pore size, basis weight, amongst others) that can lead to enhanced filtration performance (e.g., reduced air permeability decrease), in particular, in high humidity environments. The filter media may be used to form a variety of filter elements for use in various applications. In some embodiments, at least a surface of the filtration layer is hydrophilic.

34 Claims, 10 Drawing Sheets

(51) Int. Cl.
    *B01D 46/10*     (2006.01)
    *B01D 46/52*     (2006.01)
    *B01D 46/02*     (2006.01)
    *A62B 23/02*     (2006.01)
    *B01D 39/16*     (2006.01)

(52) U.S. Cl.
CPC ....... *B01D 39/2017* (2013.01); *B01D 46/023* (2013.01); *B01D 46/10* (2013.01); *B01D 46/521* (2013.01); *B01D 46/522* (2013.01); *B01D 2239/0421* (2013.01); *B01D 2239/0492* (2013.01); *B01D 2239/0622* (2013.01); *B01D 2239/10* (2013.01); *B01D 2239/1216* (2013.01); *B01D 2239/1233* (2013.01); *B01D 2239/1266* (2013.01); *B01D 2275/10* (2013.01)

(58) Field of Classification Search
CPC .......... B01D 46/522; B01D 2239/0421; B01D 2239/0492; B01D 2239/0622; B01D 2239/1216; B01D 2239/1233; B01D 2239/1266

See application file for complete search history.

(56) References Cited

U.S. PATENT DOCUMENTS

| | | | |
|---|---|---|---|
| 2,862,542 A | 12/1958 | Norton | |
| 3,012,923 A | 12/1961 | Slayter | |
| 3,180,775 A | 4/1965 | Sexsmith et al. | |
| 3,214,323 A | 10/1965 | Russell et al. | |
| 3,616,031 A | 10/1971 | Fleissner et al. | |
| 3,616,035 A | 10/1971 | Baskerville et al. | |
| 3,949,128 A | 4/1976 | Ostermeier | |
| 4,006,000 A | 2/1977 | Tortorici et al. | |
| 4,089,783 A | 5/1978 | Holyoak | |
| 4,111,733 A | 9/1978 | Periers | |
| 4,576,853 A | 3/1986 | Vaughn et al. | |
| RE32,171 E | 6/1986 | van Turnhout | |
| 4,650,506 A | 3/1987 | Barris et al. | |
| 4,701,197 A | 10/1987 | Thornton et al. | |
| 4,874,399 A | 10/1989 | Reed et al. | |
| 4,874,457 A | 10/1989 | Swieringa et al. | |
| 4,961,974 A | 10/1990 | Jones | |
| 5,084,178 A | 1/1992 | Miller et al. | |
| 5,098,767 A | 3/1992 | Linnersten | |
| 5,167,740 A | 12/1992 | Michaelis et al. | |
| 5,344,956 A | 9/1994 | Allewaert et al. | |
| 5,350,620 A | 9/1994 | Sundet et al. | |
| 5,397,632 A | 3/1995 | Murphy et al. | |
| 5,401,446 A | 3/1995 | Tsai et al. | |
| 5,491,016 A | 2/1996 | Kaiser et al. | |
| 5,558,924 A | 9/1996 | Taipei et al. | |
| 5,580,459 A | 12/1996 | Powers et al. | |
| 5,620,545 A | 4/1997 | Braun et al. | |
| 5,645,627 A | 7/1997 | Lifshutz et al. | |
| 5,656,368 A | 8/1997 | Braun et al. | |
| 5,672,399 A | 9/1997 | Kahlbaugh et al. | |
| 5,674,302 A | 10/1997 | Nakayama et al. | |
| 5,686,050 A | 11/1997 | Wadsworth et al. | |
| 5,785,725 A | 7/1998 | Cusick et al. | |
| 5,800,586 A | 9/1998 | Cusick et al. | |
| 5,800,769 A | 9/1998 | Haskett | |
| 5,804,512 A | 9/1998 | Lickfield et al. | |
| 5,814,219 A | 9/1998 | Friedmann et al. | |
| 5,820,645 A | 10/1998 | Murphy | |
| 5,830,311 A | 11/1998 | Braun et al. | |
| 5,855,783 A | 1/1999 | Shucosky et al. | |
| 5,858,045 A | 1/1999 | Stemmer et al. | |
| 5,955,174 A | 9/1999 | Wadsworth et al. | |
| 5,993,501 A | 11/1999 | Cusick et al. | |
| 5,993,580 A | 11/1999 | Nakayama et al. | |
| 6,030,428 A | 2/2000 | Ishino et al. | |
| 6,090,469 A | 7/2000 | Wadsworth et al. | |
| 6,146,436 A | 11/2000 | Hollingsworth et al. | |
| 6,171,684 B1 | 1/2001 | Kahlbaugh et al. | |
| 6,197,709 B1 | 3/2001 | Tsai et al. | |
| 6,200,368 B1 | 3/2001 | Guerin et al. | |
| 6,315,805 B1 | 11/2001 | Strauss | |
| 6,322,615 B1 | 11/2001 | Chapman | |
| 6,397,458 B1 | 6/2002 | Jones et al. | |
| 6,397,632 B1 | 6/2002 | Meagher | |
| 6,398,847 B1 | 6/2002 | Jones et al. | |
| 6,409,806 B1 | 6/2002 | Jones et al. | |
| 6,416,562 B1 | 7/2002 | Shibuya et al. | |
| 6,428,610 B1 | 8/2002 | Tsai et al. | |
| 6,432,175 B1 | 8/2002 | Jones et al. | |
| 6,514,324 B1 | 2/2003 | Chapman | |
| 6,554,881 B1 | 4/2003 | Healey | |
| 6,562,112 B2 | 5/2003 | Jones et al. | |
| 6,627,563 B1 | 9/2003 | Huberty | |
| 6,635,136 B2 | 10/2003 | White et al. | |
| 6,656,400 B2 | 12/2003 | Veeser et al. | |
| 6,660,210 B2 | 12/2003 | Jones et al. | |
| 6,743,273 B2 | 6/2004 | Chung et al. | |
| 6,780,226 B1 | 8/2004 | Lifshutz et al. | |
| 6,808,551 B2 | 10/2004 | Jones et al. | |
| 6,808,553 B2 | 10/2004 | Kawano | |
| 6,821,321 B2 | 11/2004 | Chinn et al. | |
| 6,858,057 B2 | 2/2005 | Healey | |
| 6,867,156 B1 | 3/2005 | White et al. | |
| 6,867,256 B1 | 3/2005 | Di Silvestro et al. | |
| 6,872,311 B2 | 3/2005 | Koslow | |
| 6,872,431 B2 | 3/2005 | Kahlbaugh et al. | |
| 6,932,907 B2 | 8/2005 | Haq et al. | |
| 6,953,544 B2 | 10/2005 | Jones et al. | |
| 6,966,939 B2 | 11/2005 | Rammig et al. | |
| 6,986,804 B2 | 1/2006 | Dominiak et al. | |
| 6,998,164 B2 | 2/2006 | Neely et al. | |
| 7,008,465 B2 | 3/2006 | Graham et al. | |
| 7,045,029 B2 | 5/2006 | DeLucia et al. | |
| 7,137,510 B1 | 11/2006 | Klein et al. | |
| 7,314,497 B2 | 1/2008 | Kahlbaugh et al. | |
| 7,326,272 B2 | 2/2008 | Hornfeck et al. | |
| 7,883,562 B2 | 2/2011 | Healey et al. | |
| 7,959,751 B2 | 6/2011 | Hanson et al. | |
| 8,197,569 B2 | 6/2012 | Healey et al. | |
| 8,202,340 B2 | 6/2012 | Healey et al. | |
| 8,257,459 B2 | 9/2012 | Healey et al. | |
| 8,262,780 B2 | 9/2012 | Smithies et al. | |
| 8,282,712 B2 | 10/2012 | Chi et al. | |
| 8,394,183 B2 | 3/2013 | Ishida et al. | |
| 8,608,817 B2 | 12/2013 | Wertz et al. | |
| 8,882,875 B2 | 11/2014 | Healey et al. | |
| 9,687,771 B2 | 6/2017 | Healey | |
| 9,718,020 B2 | 8/2017 | Healey et al. | |
| 2003/0022584 A1 | 1/2003 | Latimer et al. | |
| 2003/0150199 A1 | 8/2003 | Tanaka et al. | |
| 2003/0203695 A1 | 10/2003 | Polanco et al. | |
| 2003/0203696 A1 | 10/2003 | Healey | |
| 2003/0213109 A1 | 11/2003 | Neely et al. | |
| 2004/0035095 A1 | 2/2004 | Healey | |
| 2004/0060269 A1 | 4/2004 | Chung et al. | |
| 2005/0011173 A1 | 1/2005 | Hornfeck et al. | |
| 2005/0193696 A1 | 9/2005 | Muller et al. | |
| 2006/0005517 A1 | 1/2006 | Sundet et al. | |
| 2006/0042049 A1 | 3/2006 | Petersen | |
| 2006/0091066 A1 | 5/2006 | Driml et al. | |
| 2006/0272303 A1 | 12/2006 | Fujiwara et al. | |
| 2007/0084786 A1 | 4/2007 | Smithies | |
| 2007/0220852 A1 | 9/2007 | Lifshutz et al. | |
| 2007/0283808 A1 | 12/2007 | Chung et al. | |
| 2007/0295659 A1 | 12/2007 | Rygalski et al. | |
| 2008/0023121 A1 | 1/2008 | Hanson et al. | |
| 2008/0067121 A1 | 3/2008 | Ter Horst et al. | |
| 2008/0110342 A1 | 5/2008 | Ensor et al. | |
| 2008/0202078 A1* | 8/2008 | Healey | B01D 39/1623 55/341.1 |
| 2008/0217241 A1 | 9/2008 | Smithies et al. | |
| 2008/0245041 A1 | 10/2008 | Choi | |
| 2008/0302242 A1 | 12/2008 | Schelling et al. | |
| 2008/0314821 A1* | 12/2008 | Ohashi | B01D 39/1623 210/503 |

(56) References Cited

U.S. PATENT DOCUMENTS

| | | |
|---|---|---|
| 2009/0249956 A1* | 10/2009 | Chi .................. B01D 39/1623 95/284 |
| 2009/0266048 A1 | 10/2009 | Schwarz |
| 2009/0272084 A1 | 11/2009 | Healey et al. |
| 2010/0107881 A1 | 5/2010 | Healey et al. |
| 2010/0181249 A1 | 7/2010 | Green et al. |
| 2010/0320138 A1 | 12/2010 | Waller et al. |
| 2011/0162337 A1 | 7/2011 | Healey et al. |
| 2011/0214570 A1 | 9/2011 | Jones et al. |
| 2012/0152824 A1 | 6/2012 | Cox et al. |
| 2012/0304602 A1 | 12/2012 | Healey et al. |
| 2013/0025245 A1 | 1/2013 | Healey |
| 2013/0025809 A1 | 1/2013 | Godsay et al. |
| 2013/0263738 A1* | 10/2013 | Wang .................. B01D 46/521 95/285 |
| 2014/0157742 A1 | 6/2014 | Healey et al. |
| 2014/0265009 A1 | 9/2014 | Schaffitzel |
| 2014/0331626 A1* | 11/2014 | Nagy ................. B01D 39/1623 55/487 |
| 2015/0053627 A1 | 2/2015 | Silin et al. |
| 2015/0121823 A1 | 5/2015 | Healey |
| 2015/0375150 A1 | 12/2015 | Sahbaee et al. |
| 2016/0136554 A1 | 5/2016 | Swaminathan et al. |
| 2016/0177891 A1 | 6/2016 | Yadav et al. |
| 2017/0080368 A1 | 3/2017 | Smith et al. |
| 2018/0015405 A1 | 1/2018 | Healey et al. |
| 2018/0272258 A1 | 9/2018 | Healey et al. |

FOREIGN PATENT DOCUMENTS

| | | |
|---|---|---|
| GB | 2 389 326 A | 12/2003 |
| JP | 58-088019 A | 5/1983 |
| JP | 62-024922 U | 2/1987 |
| JP | 62-087723 U | 6/1987 |
| JP | 04-045813 A | 2/1992 |
| JP | 04-180808 A | 6/1992 |
| JP | 08-024546 A | 1/1996 |
| JP | 3074719 U | 1/2001 |
| JP | 2001-179028 A | 7/2001 |
| JP | 2003-181228 A | 7/2003 |
| WO | WO 94/11089 A1 | 5/1994 |
| WO | WO 01/08781 A2 | 2/2001 |
| WO | WO 2007/147062 A2 | 12/2007 |
| WO | WO 2007/147065 A2 | 12/2007 |
| WO | WO 2008/150548 A2 | 12/2008 |
| WO | WO 2014/073802 A1 | 5/2014 |
| WO | WO 2014/149750 A1 | 9/2014 |

OTHER PUBLICATIONS

U.S. Appl. No. 14/042,210, filed Sep. 30, 2013, Healey et al.
U.S. Appl. No. 15/601,522, filed May 22, 2017, Healey et al.
U.S. Appl. No. 14/314,121, filed Jun. 25, 2014, Sahbaee.
U.S. Appl. No. 14/858,398, filed Sep. 18, 2015, Smith et al.
U.S. Appl. No. 15/466,809, filed Mar. 22, 2017.
PCT/US2016/052070, Jan. 25, 2017, **International Search Report and Written Opinion.
International Search Report and Written Opinion for PCT/US2018/023529 dated May 30, 2018.
Joubert et al., Influence of Humidity on Clogging of Flat and Pleated HEPA Filters. Aerosol Science and Technology. 2010;44(12):1065-76.
PCT/US2018/023529, May 30, 2018, International Search Report and Written Opinion.

* cited by examiner

FILTER MEDIA INCLUDING A WAVED FILTRATION LAYER

RELATED APPLICATIONS

This application is a continuation-in-part of U.S. patent application Ser. No. 14/858,398, filed Sep. 18, 2015, which is incorporated herein by reference in its entirety for all purposes.

FIELD OF THE INVENTION

The present invention relates to filtration and, more particularly, to filter media that include a waved filtration layer.

BACKGROUND

Filter media can be used to remove contamination in a variety of applications. In general, filter media include one or more fiber webs. The fiber web provides a porous structure that permits fluid (e.g., air) to flow through the web. Contaminant particles contained within the fluid may be trapped on the fiber web. Fiber web characteristics (e.g., pore size, fiber dimensions, fiber composition, basis weight, amongst others) affect filtration performance of the media. Although different types of filter media are available, improvements are needed.

SUMMARY

In one aspect, a filter media is provided. In some embodiments, the filter media comprises a fiber filtration layer and a support layer that holds the fiber filtration layer in a waved configuration and maintains separation of peaks and troughs of adjacent waves of the fiber filtration layer, wherein at least a surface of the fiber filtration layer is hydrophilic.

In some embodiments, the filter media comprises a fiber filtration layer and a support layer that holds the fiber filtration layer in a waved configuration and maintains separation of peaks and troughs of adjacent waves of the fiber filtration layer, wherein at least a surface of the fiber filtration layer is hydrophilic and wherein the filter media has a decrease in air permeability of less than or equal to 20% after humidity loading at 95%.

In some embodiments, the filter media comprises a fiber filtration layer and a support layer that holds the fiber filtration layer in a waved configuration and maintains separation of peaks and troughs of adjacent waves of the fiber filtration layer. The fiber filtration layer has a mean flow pore size of at least about 11.5 microns. The filter media has a minimum DEHS particle filtration efficiency of at least about 25%.

In some embodiments, the filter media comprises a fiber filtration layer and a support layer that holds the fiber filtration layer in a waved configuration and maintains separation of peaks and troughs of adjacent waves of the fiber filtration layer. The fiber filtration layer in the waved configuration is formed from a fiber layer having a planar configuration and a transition salt load of at least about 2.0 gsm. The filter media has a minimum DEHS particle filtration efficiency of at least about 25%.

Other aspects and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

DETAILED DESCRIPTION

Filter media including a waved filtration layer are described herein. The filtration layer may be held in a waved configuration by a support layer. As described further below, the filtration layer may have a combination of characteristics (e.g., mean flow pore size and/or basis weight and/or hydrophilic surface(s), amongst others) that can lead to enhanced filtration performance (e.g., efficiency), in particular, in high humidity environments. The filter media may be used to form a variety of filter elements for use in various applications.

Media

In general, various filter media are provided having at least one filtration (e.g., fibrous) layer that is held in a waved or curvilinear configuration by one or more additional support layers (e.g., fibrous). As a result of the waved configuration, the filter media has an increased surface area which can result in improved filtration properties. The filter media can include various layers, and only some or all of the layers can be waved.

Figure 1A:
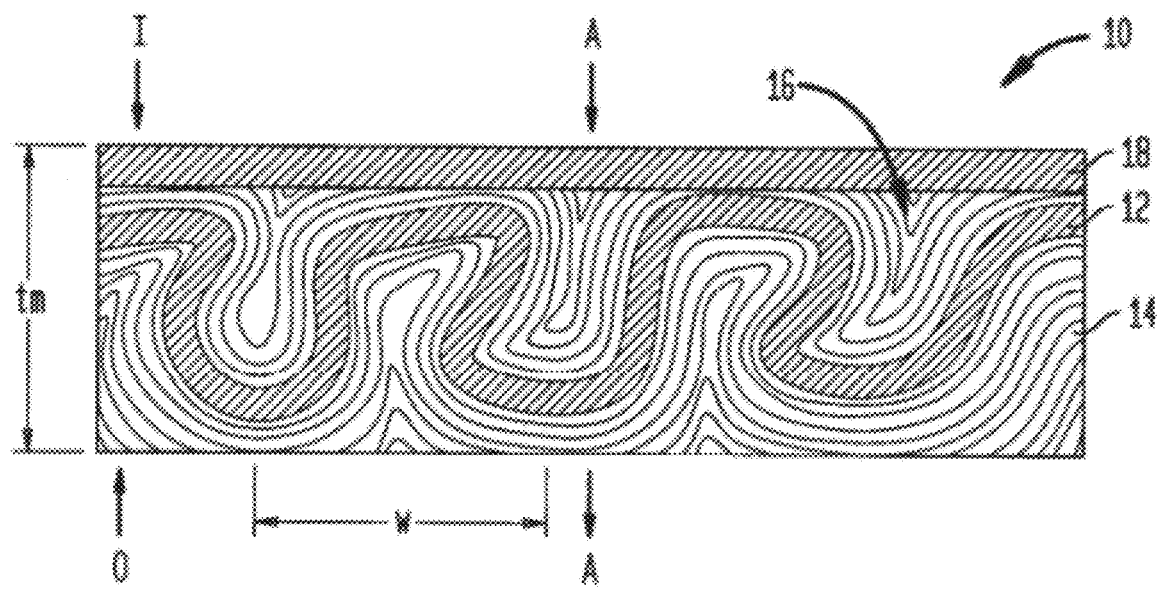
FIG. 1A is a side view illustration of one embodiment of a filter media.

FIG. 1A illustrates one exemplary embodiment of a filter media 10 having at least one filtration layer and at least one support layer that holds the filtration layer in a waved configuration to maintain separation of peaks and troughs of adjacent waves of the filtration layer. In the illustrated embodiment, the filter media 10 includes a fiber filtration layer (e.g., a fine fiber filtration layer) 12, a first, downstream support layer 14, and a second, upstream support layer 16 disposed on opposite sides of the fiber filtration layer 12. The support layers 14, 16 can help maintain the fiber filtration layer 12, and optionally any additional filtration layers, in the waved configuration. While two support layers 14, 16 are shown, the filter media 10 need not include both support layers. Where only one support layer is provided, the support layer can be disposed upstream or downstream of the filtration layer(s).

The filter media 10 can also optionally include one or more outer or cover layers located on the upstream-most and/or downstream-most sides of the filter media 10. FIG. 1A illustrates a top layer 18 disposed on the upstream side of the filter media 10 to function, for example, as an upstream dust holding layer. The top layer 18 can also function as an aesthetic layer, which will be discussed in more detail below. The layers in the illustrated embodiment are arranged so that the top layer 18 is disposed on the air entering side, labeled I, the second support layer 16 is just downstream of the top layer 18, the fiber filtration layer 12 is disposed just downstream of the second support layer 16, and the first support layer 14 is disposed downstream of the first layer 12 on the air outflow side, labeled O. The direction of air flow, i.e., from air entering I to air outflow O, is indicated by the arrows marked with reference A.

Figure 1B:
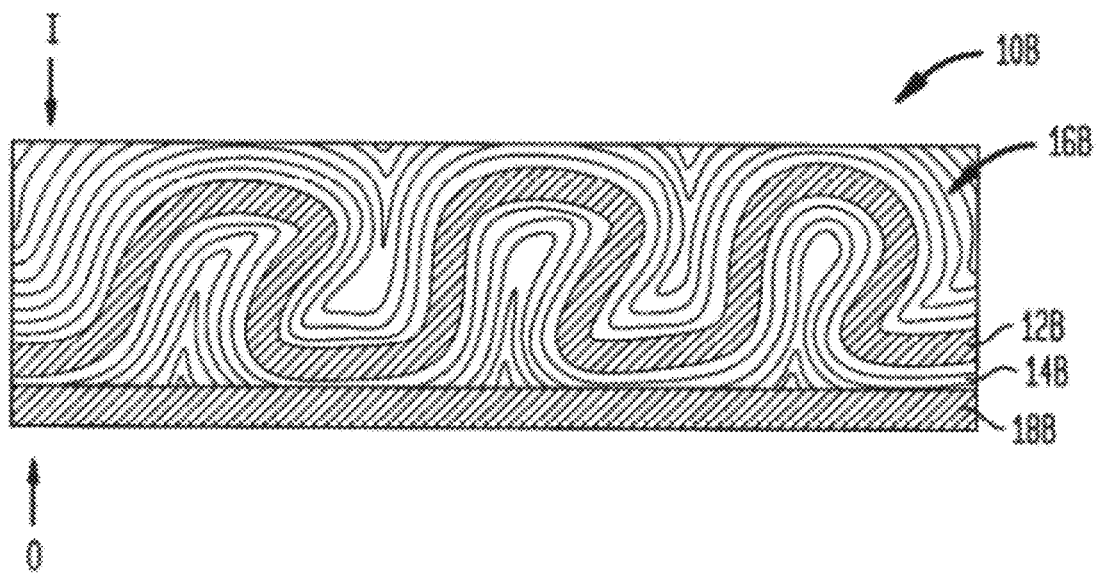
FIG. 1B is a side view illustration of another embodiment of a filter media.

The outer or cover layer can alternatively or additionally be a bottom layer disposed on the downstream side of the filter media 10 to function as a strengthening component that provides structural integrity to the filter media 10 to help maintain the waved configuration. The outer or cover layer (s) can also function to offer abrasion resistance. FIG. 1B illustrates another embodiment of a filter media 10B that is similar to filter media 10 of FIG. 1B. In this embodiment, the filter media 10B does not include a top layer, but rather has a fiber filtration layer 12B, a first support layer 14B disposed just downstream of the fiber filtration layer 12B, a second support layer 16B disposed just upstream of the fiber filtration layer 12B on the air entering side I, and a bottom layer 18B disposed just downstream of the first support layer 14B on the air exiting side O. Furthermore, as shown in the exemplary embodiments of FIGS. 1A and 1B, the outer or cover layer(s) can have a topography different from the topographies of the fiber filtration layer and/or any support layers. For example, in either a pleated or non-pleated configuration, the outer or cover layer(s) may be non-waved (e.g., substantially planar), whereas the fiber filtration layer and/or any support layers may have a waved configuration. A person skilled in the art will appreciate that a variety of other configurations are possible, and that the filter media can include any number of layers in various arrangements.

Fiber Filtration Layer

As indicated above, in an exemplary embodiment the filter media 10 includes at least one fiber filtration layer 12, which may optionally be hydrophobic or hydrophilic. In an exemplary embodiment, a single filtration layer 12 formed from fine fibers is used, however the filter media 10 can include any number of additional filtration layers disposed between the downstream support layer and the upstream support layer, adjacent to the fiber filtration layer 12, or disposed elsewhere within the filter media. While not shown, the additional filtration layer(s) can be maintained in a waved configuration with the fiber filtration layer 12. In certain exemplary embodiment the filter media 10 can include one or more additional filtration layers disposed upstream of the fiber filtration layer 12. The additional filtration layer(s) can be formed from fine fibers, or can be formed from fibers having an average fiber diameter that is greater than an average fiber diameter of the fibers that form the fiber filtration layer 12.

The fiber filtration layer may be designed to have a particular mean flow pore size. Advantageously, fiber filtration layers having a mean flow pore size of 11.5 microns or greater may, in some embodiments, have increased NaCl loading, improved high humidity performance, and/or smaller reduction in air permeability after NaCl loading as compared to fiber filtration layers having smaller mean flow pore sizes. However, a mean flow pore size of 11.5 microns or greater is not intended to be limiting and other embodiments may include other ranges (e.g., between about 5 microns and about 45 microns).

In some embodiments, the fiber filtration layer has a mean flow pore size of at least about 5 microns, at least about 6 microns, at least about 8 microns, at least about 10 microns, at least about 11 microns, at least about 11.5 microns, at least about 13 microns, at least about 15 microns, at least about 16 microns, at least about 20 microns, at least about 25 microns, at least about 30 microns, at least about 35 microns, or at least about 40 microns. In certain embodiments, the fiber filtration layer has a mean flow pore size less than or equal to about 45 microns, less than or equal to about 40 microns, less than or equal to about 35 microns, less than or equal to about 30 microns, less than or equal to about 25 microns, less than or equal to about 20 microns, less than or equal to about 16 microns, less than or equal to about 15 microns, less than or equal to about 13 microns, less than or equal to 11.5 microns, less than or equal to 11 microns, less than or equal to 10 microns, less than or equal to 8 microns, or less than or equal to 6 microns. Combinations of the above referenced ranges are also possible (e.g., between about 5 microns and about 45 microns, between about 11.5 microns and about 45 microns, between about 11.5 microns and about 25 microns, between about 11.5 microns and about 16 microns). Other ranges are also possible including, in some embodiments, less than 11.5 microns (e.g., between about 5 microns and about 11 microns).

As used herein, the mean flow pore size refers to the mean flow pore size measured by a capillary flow porometer (e.g., Model CFP-34RTF 8A-X-6 manufactured by Porous Materials, Inc.) in accordance with the ASTM F316-03 standard using a 1,1,2,3,3,3-hexafluoropropene low surface tension fluid. The mean flow pore size of a fiber filtration layer may be designed by selecting an average fiber diameter, basis weight, and/or thickness of the layer as known to those of ordinary skill in the art. In some cases, mean flow pore size may be designed by adjusting processing parameters such as air flow rate and/or temperature during manufacturing (e.g., using meltblowing techniques) of the fiber filtration layer. In some embodiments, a combination of filtration layers may have a mean flow pore size in one or more of the above-referenced ranges. Additionally, in embodiments in which more than one filtration layers are present in a media, each filtration layer may have a mean flow pore size having one or more of the above-referenced ranges.

The basis weight of the fiber filtration layer can be designed by adjusting processing parameters such as the number of fibers included in the filtration layer. In some embodiments, the basis weight of the fiber filtration layer may be greater than or equal to about 3 $g/m^2$, greater than or equal to about 5 $g/m^2$, greater than or equal to about 8 $g/m^2$, greater than or equal to about 10 $g/m^2$, greater than or equal to about 12 $g/m^2$, greater than or equal to about 14 $g/m^2$, greater than or equal to about 15 $g/m^2$, greater than or equal to about 16 $g/m^2$, greater than or equal to about 18 $g/m^2$, greater than or equal to about 20 $g/m^2$, greater than or equal to about 25 $g/m^2$, greater than or equal to about 30 $g/m^2$, greater than or equal to about 35 $g/m^2$, greater than or equal to about 40 $g/m^2$, or greater than or equal to about 45 $g/m^2$. In some cases, the basis weight of the fiber filtration layer may be less than or equal to about 50 g/m² (e.g., less than or equal to about 50 g/m², less than or equal to about 45 g/m², less than or equal to 40 g/m², less than or equal to about 35 g/m², less than or equal to about 30 g/m², less than or equal to about 25 g/m², less than or equal to about 20 g/m², less than or equal to about 18 g/m², less than or equal to about 16 g/m², less than or equal to about 15 g/m², less than or equal to about 14 g/m², less than or equal to about 12 g/m², less than or equal to 10 g/m², less than or equal to 8 g/m², or less than or equal to 5 g/m². Combinations of the above-referenced ranges are also possible (e.g., a basis weight greater than or equal to about 3 g/m² and less than or equal to about 50 g/m², of greater than or equal to about 10 g/m² and less than or equal to about 40 g/m², or greater than or equal to about 14 and less than or equal to about 20 g/m²). Other ranges are also possible. In some embodiments, a combination of filtration layers may have a combined basis weight in one or more of the above-referenced ranges. As determined herein, the basis weight of the filtration layer is measured according to the Edana WSP 130.1 Standard. Additionally, in embodiments in which more than one filtration layers are present in a media, each filtration layer may have a basis weight having one or more of the above-referenced ranges.

In some embodiments, the basis weight and/or mean flow pore size may be tuned such that the fiber filtration layer has a desired minimum DEHS (diethyl-hexyl-sebacate) particle filtration efficiency. In some cases, the basis weight of the fiber filtration layer and/or the mean flow pore size of the fiber filtration layer may be increased or decreased, such that the fiber filtration layer has a particular minimum DEHS particle filtration efficiency (e.g., a minimum DEHS particle filtration efficiency of at least about 25%). For example, in some embodiments, the basis weight may be adjusted (e.g., increased) for a fiber filtration layer having a mean flow pore size of at least about 11.5 microns such that the fiber filtration layer has a minimum DEHS particle filtration efficiency of at least about 25%. In some embodiments and as described further in Example 1, the relationship between the basis weight, mean flow pore size, and efficiency of the fiber filtration layer may be expressed as:

$$BW > \frac{-MP^a \ln(1-E)}{b}$$

wherein BW is the basis weight (in grams per square meter) of the fiber filtration layer, MP is the mean pore size (in microns) of the fiber filtration layer, a and b are coefficients, and E is the minimum DEHS particle filtration efficiency (expressed as a fraction) of the fiber filtration layer. In some embodiments, a is 2 and b is 6.5. In some embodiments, a is a number greater than or equal to 2 and less than or equal to 2.3, and b is a number greater than or equal to 6.5 and less than or equal to about 8. For example, in some other embodiments, a is 2, 2.1, 2.25, or 2.28 and b is 6.5, 7, 7.5, or 8. In some cases, the parameters may be selected (e.g., basis weight) to obtain a particular minimum DEHS particle filtration efficiency (e.g., a minimum DEHS particle filtration efficiency of at least about 0.25 (i.e., 25%) or at least about 0.35 (i.e., 35%)) for a given mean flow pore size. For example, in some cases, the fiber filtration layer has a particular minimum DEHS particle filtration efficiency (e.g., at least about 25% or at least about 35%) and a particular mean flow pore size (e.g., at least about 11.5 microns), and the basis weight may be designed to be at least about 8.76 g/m², when a is 2 and b is 6.5. Without wishing to be bound by theory, the equation above demonstrates a relationship between basis weight, mean flow pore size, and efficiency of a fiber filtration layer which can be used to design fiber filtration layer(s) that provide desirable performance under humid conditions, including a smaller decrease in air permeability in humid environments as compared to certain traditional fiber filtration layers. Air permeability in humid environments is described in more detail below.

The fiber filtration layers and/or filter media described herein (e.g., having a mean flow pore size of at least about 11.5 microns) may have a wide range of minimum DEHS particle filtration efficiencies. In some embodiments, the minimum DEHS particle filtration efficiency of the fiber filtration layer and/or filter media is between about 25% and about 75%, between about 30% and 75%, or between about 35% and about 55%. In some embodiments, the fiber filtration layer and/or filter media has a minimum DEHS particle filtration efficiency of greater than or equal to about 25%, greater than or equal to about 30%, greater than or equal to about 35%, greater than or equal to about 45%, greater than or equal to about 55%, or greater than or equal to about 65%. Other minimum DEHS particle filtration efficiencies are also possible. In some embodiments, the fiber filtration layer and/or filter media has a minimum DEHS particle filtration efficiency of less than or equal to 75%, less than or equal to 65%, less than or equal to 55%, or less than or equal to 45%. In some embodiments, a combination of fiber filtration layers may have a minimum DEHS particle filtration efficiency in one or more of the above-referenced ranges. In some embodiments, the minimum DEHS particle efficiency of the filter media may be greater than that of the fiber filtration layer, because additional layers added to the media (e.g., an outer or cover layer) may help to trap particles, thereby increasing the minimum DEHS particle of the overall filter media.

In some embodiments, the fiber filtration layers and/or filter media described herein (e.g., having a mean flow pore size of at least about 11.5 microns) may have a wide range of average DEHS particle filtration efficiencies. In some embodiments, the average DEHS efficiency of the fiber filtration layer and/or filter media is greater than or equal to about 25%, greater than or equal to about 30%, greater than or equal to about 35%, greater than or equal to about 40%, greater than or equal to about 45%, greater than or equal to about 50%, greater than or equal to about 55%, greater than or equal to about 60%, greater than or equal to about 65%, greater than or equal to about 70%, greater than or equal to about 75%, or greater than or equal to about 80%. Other efficiencies are also possible. In some embodiments, the fiber filtration layer and/or filter media has an average DEHS efficiency of less than or equal to 99.9%, less than or equal to 99.8%, less than or equal to 99.7%, less than or equal to 99.5%, less than or equal to 99%, less than or equal to 98%, less than or equal to 95%, less than or equal to 90%, less than or equal to 85%, less than or equal to 80%, less than or equal to 70%, less than or equal to 60%, or less than or equal to 50%. In some embodiments, the average DEHS particle efficiency of the filter media may be greater than that of the fiber filtration layer, because additional layers added to the media (e.g., an outer or cover layer) may help to trap particles, thereby increasing the average DEHS particle efficiency of the overall filter media.

The minimum and average DEHS particle filtration efficiency of a filtration layer or a filter media, as referred to herein, are tested following the EN779-2012 standard and using 0.4 micron or larger. The testing uses an air flow of 0.944 m³/s. The testing begins by initially measuring the pressure drop and DEHS particle efficiency of a sample. The testing then involves progressively loading the sample with standard test dust (ANSI/ASHRAE 52.2) in 30 g increments and measuring the pressure drop and DEHS particle efficiency after each loading increment until a pressure drop of 450 Pa or greater is reached at which point the testing is complete. The minimum DEHS particle filtration efficiency, as used herein, refers to the lowest DEHS particle efficiency obtained throughout the test. The average DEHS particle filtration efficiency, as used herein, is determined as the average of the DEHS particle efficiencies obtained throughout the test (including the DEHS particle efficiency measured initially prior to standard test dust loading and the DEHS particle efficiencies at all loading levels including the particle DEHS efficiency at the maximum test pressure of 450 Pa or greater).

As described herein, the fiber filtration layers (e.g., having a mean flow pore size greater than about 11.5 microns) and/or filter media may advantageously have improved performance (e.g., reduced air permeability decrease) in high humidity environments as compared to certain traditional fiber filtration layers (e.g., having mean flow pore sizes less than about 11.5 microns). Without wishing to be bound by theory, improved humidity performance may be generally correlated with increased transition salt loading of a fiber filtration layer. In some cases, transition salt loading may be measured using a NaCl (sodium chloride) challenge (or NaCl loading), which employs an automated filter testing unit (e.g., 8130 CertiTest™ from TSI, Inc.) equipped with a sodium chloride generator. The average particle size created by the salt particle generator is about 0.3 micron mass mean diameter. The instrument measures a pressure drop across the filtration layer and/or filter media and the resultant penetration value on an instantaneous basis. The testing unit can be run in a continuous mode with one pressure drop/penetration reading approximately every minute. The NaCl particles at a concentration of 23 mg NaCl/m³ air are continuously loaded onto a 100 cm² sample at a flow rate of 5.3 cm/s. The samples are continuously loaded until 1% (or lower) penetration is achieved. Penetration, often expressed as a percentage, is defined as follows:

$$Pen = C/C_0$$

where C is the particle concentration after passage through the filter and $C_0$ is the particle concentration before passage through the filter.

Figure 2A:
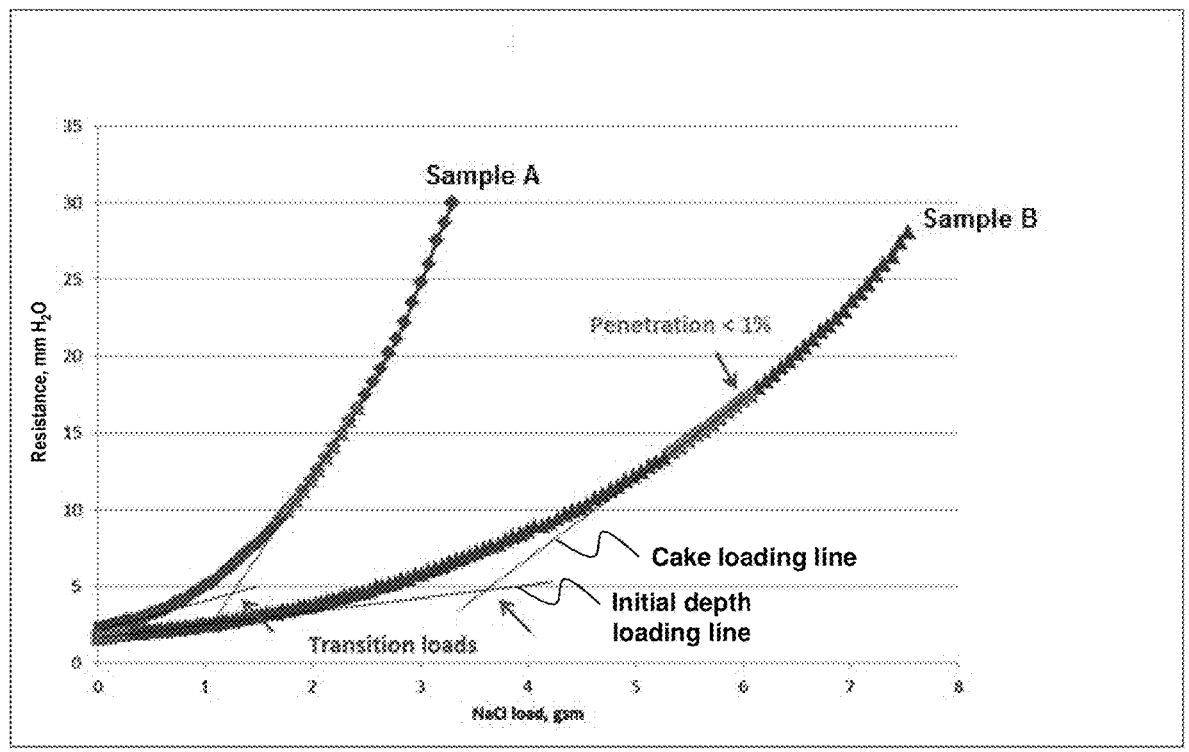
FIG. 2A is a plot showing resistance pressure versus salt loading for various fiber filtration layers.

In some embodiments, the fiber filtration layer and/or the filter media has a transition salt load of at least about 2.0 gsm (grams per square meter). Transition salt load may be determined by performing NaCl loading as described above on a planar fiber filtration layer or on the filter media as a whole, and plotting the resistance pressure (in mm $H_2O$) as a function of NaCl load (gsm (i.e., grams per square meter)). Referring now to FIG. 2A, an initial depth loading line is calculated by fitting a simple linear regression line to the initial ten minute region (i.e., initial ten consecutive data points) of the NaCl loading curve (i.e., resistance pressure versus NaCl load) which begins with the first reading taken at one minute after the onset of testing. A cake loading line (see FIG. 2A) is calculated by fitting a simple linear regression line to ten consecutive data points of the NaCl loading curve, wherein the first through tenth data points are selected such that penetration of the fiber filtration layer and/or filter media is less than 1% and the eleventh data point (not included in the simple linear regression fit) is greater than or equal to 1% penetration (e.g., drawn through 10 data points preceding and including the one at which measured penetration drops below 1%). The transition salt load described herein is defined as the value of NaCl load (in grams) per unit area (in square meters) of the fiber filtration layer at the intersection of the initial depth loading line and the cake loading line.

In some embodiments, the transition salt load of a planar fiber filtration media is at least about 2.0 gsm, at least about 2.5 gsm, at least about 3.0 gsm, at least about 3.5 gsm, at least about 4.0 gsm, or at least about 5.0 gsm. In some embodiments, the transition salt load is less than or equal to about 10.0 gsm, less than or equal to about 5.0 gsm, less than or equal to about 4.0 gsm, less than or equal to about 3.5 gsm, less than or equal to about 3.0 gsm, or less than or equal to about 2.5 gsm. Combinations of the above referenced ranges are also possible (e.g., between about 2.0 gsm and about 10.0 gsm). The fiber filtration layers and filter media described herein generally have increased transition salt loads as compared to traditional filtration layers and filter media which, generally, corresponds to lower resistance pressures for an equivalent amount of NaCl loading.

The slope of the cake loading line, described herein, may have a particular value. In some embodiments, the slope of the cake loading line of the fiber filtration layer may be less than or equal to about 7.5 mm $H_2O$/gsm salt load, less than or equal to about 7 mm $H_2O$/gsm salt load, less than or equal to about 6 mm $H_2O$/gsm salt load, less than or equal to about 5.5 mm $H_2O$/gsm salt load, less than or equal to about 5 mm $H_2O$/gsm salt load, less than or equal to about 4.5 mm $H_2O$/gsm salt load, less than or equal to about 4 mm $H_2O$/gsm salt load, or less than or equal to about 3.5 mm $H_2O$/gsm salt load. In some embodiments, the slope of the cake loading line of the fiber filtration layer may be greater than or equal to 0 mm $H_2O$/gsm salt load, greater than or equal to about 1 mm $H_2O$/gsm salt load, greater than or equal to about 2 mm $H_2O$/gsm salt load, greater than or equal to about 3 mm $H_2O$/gsm salt load, greater than or equal to about 4 mm $H_2O$/gsm salt load, greater than or equal to about 4.5 mm $H_2O$/gsm salt load, greater than or equal to about 5 mm $H_2O$/gsm salt load, greater than or equal to about 5.5 mm $H_2O$/gsm salt load, or greater than or equal to about 6 mm $H_2O$/gsm salt load, or greater than or equal to about 7 mm $H_2O$/gsm salt load. Combinations of the above referenced ranges are also possible (e.g., between 0 mm $H_2O$/gsm salt load and about 7 mm $H_2O$/gsm salt load, between 1 mm $H_2O$/gsm salt load and about 7 mm $H_2O$/gsm salt load, between about 3 mm $H_2O$/gsm salt load and about 6 mm $H_2O$/gsm salt load, between about 5 mm $H_2O$/gsm salt load and about 6 mm $H_2O$/gsm salt load). Other ranges are also possible.

Advantageously, in some embodiments, the fiber filtration layers described herein (e.g., having a mean flow pore size greater than about 11.5 microns) and/or filter media may have relatively lower decrease in air permeability in humid environments as compared to certain traditional fiber filtration layers (e.g., having a mean flow pore size less than about 11.5 microns) and/or filter media. In some embodiments, the percent decrease in air permeability after humidity loading is less than or equal to about 50%, less than or equal to about 45%, less than or equal to about 44%, less than or equal to about 42%, less than or equal to about 40%, less than or equal to about 35%, less than or equal to about 30%, or less than or equal to about 25%. In certain embodiments, the percent decrease in air permeability after humidity loading is at least about 25%, at least about 35%, at least about 40%, at least about 42%, at least about 44%, or at least about 45%. Combinations of the above-referenced ranges are also possible (e.g., a decrease in air permeability after humidity loading of between about 35% and 50%, between about 42% and about 45%, between about 42% and about 50%). Other ranges are also possible.

Air permeability after humidity loading, as referred to herein, is determined by performing a humidity challenge after loading a 100 cm² sample with NaCl aerosol (23 mg NaCL/m³ air) of approximately 0.3 micron particle for 30 minutes using an automated filter testing unit (e.g., TSI 8130 CertiTest™ from TSI, Inc.) equipped with a sodium chloride generator. Samples (e.g., filter media in a waved configuration including a fiber filtration layer and a support layer) are loaded at a face velocity of 14.1 cm/sec for 30 minutes. Once loaded with NaCl, the samples are placed into a sample holder connected to an Frazier air permeability machine and enclosed in a chamber containing a steam generator to generate humidity. A hygrometer probe is inserted into the box to measure the temperature and humidity within the chamber. At the beginning of the test the relative humidity in the chamber is 50% and the test is conducted by taking initial air permeability readings at pressure drop of 0.5" water column, after which the steam generator is turned on and air permeability and humidity readings are taken every 30 seconds. Once humidity reaches 90% (or, in some cases, 95%), the readings are continued for approximately 12 minutes, after which the steam generator is turned off. Readings are continued until the relative humidity in the chamber returns to its level at the beginning of the test (i.e., 50%), at which point the air permeability has stabilized. The percent decrease in air permeability after humidity loading is the difference between the maximum air permeability value (which is the air permeability value measured when the relative humidity has returned to its level at the beginning of the test, i.e., 50%) minus the minimum air permeability value (at either 90% or 95%, as the case may be) expressed as a percentage of the maximum air permeability value.

In some cases, the fiber filtration layer may have a particular solidity. Solidity, as used herein, generally refers the basis weight of the fiber filtration layer divided by the average density of the fibers times the uncompressed thickness of the fiber filtration layer (i.e. BW/(p*t)), where BW is the basis weight, p is the density, and t is the uncompressed thickness). Uncompressed thickness, as used herein, refers to the thickness of the fiber filtration layer as determined from a measurement of the thickness of the fiber filtration layer with a micrometer under a series of different loads) and extrapolating to determine the thickness under zero loading. In some embodiments, the fiber filtration layer has a solidity of at least about 1%, at least about 2%, at least about 2.5%, at least about 5%, at least about 10%, at least about 13%, or at least about 15%. In certain embodiments, the fiber filtration layer has a solidity of less than or equal to about 20%, less than or equal to about 15%, less than or equal to about 13%, less than or equal to about 10%, less than or equal to about 5%, less than or equal to about 4%, less than or equal to about 3.5%, less than or equal to about 3%, less than or equal to about 2.5%, or less than or equal to about 2%. Combinations of the above-referenced ranges are also possible (e.g., between about 1% and about 20%, between about 2.5% and about 13%, between about 5% and about 20%). Other ranges are also possible.

In some embodiments, the fiber filtration layer may have a particular surface area. In some cases, the surface area of the fiber filtration layer may be between about 0.8 square meters per gram and about 2.5 square meters per gram. For example, the surface area may be between about 1.2 square meters per gram and about 1.6 square meters per gram. Surface area can be determined by any suitable method known in the art including, for example, BET gas adsorption.

The fiber filtration layer 12 can be formed from a variety of fibers, but in an exemplary embodiment the fiber filtration layer 12 is formed from fibers having an average fiber diameter that is less than or equal to about 10 microns, less than or equal to about 8 microns, less than about 5 microns, less than about 4 microns, less than about 3 microns, less than about 2 microns, less than about 1.6 microns, less than about 1.2 microns, less than about 1 micron, less than about 0.8 microns, less than about 0.5 microns, less than about 0.4 microns, or less than about 0.3 microns. In certain embodiments, the fiber filtration layer has an average fiber diameter of at least 0.2 microns, at least 0.3 microns, at least 0.4 microns, at least about 0.5 microns, at least about 0.8 microns, at least about 1 micron, at least about 1.2 microns, at least about 1.6 microns, at least about 2 microns, at least about 3 microns, at least about 4 microns, at least about 5 microns, or at least about 8 microns. Combinations of the above referenced ranges are also possible (e.g., between about 0.5 microns and about 10 microns, between about 1 micron and about 5 microns, between about 1.6 microns and about 3 microns, between about 0.2 microns and about 10 microns). Other ranges are also possible. The average diameter of a fiber can be determined, for example, by scanning electron microscopy.

Various materials can also be used to form the fibers, including synthetic and non-synthetic materials. In one exemplary embodiment, the fiber filtration layer 12, and any additional filtration layer(s), is formed from meltblown fibers. Certain suitable meltblown processes have been described in commonly-owned U.S. Pat. No. 8,608,817, which is incorporated herein by reference in its entirety. In some embodiments, the fiber filtration layer may be formed by wet laid techniques, air laid techniques, electrospinning, spunbonding, centrifugal spinning or carding. Exemplary materials include, by way of non-limiting example, polyolefins, such as polypropylene and polyethylene; polyesters, such as polybutylene terephthalate and polyethylene terephthalate; polyamides, such as Nylon; polycarbonate; polyphenylene sulfide; polystyrene; and polyurethane.

The fiber filtration layer may include a suitable percentage of synthetic fibers. For example, in some embodiments, the weight percentage of synthetic fibers in the filtration layer may be between about 50 wt % and about 100 wt % of all fibers in the filtration layer. In some embodiments, the weight percentage of synthetic fibers in the filtration layer may be greater than or equal to about 50 wt %, greater than or equal to about 60 wt %, greater than or equal to about 70 wt %, greater than or equal to about 80 wt %, greater than or equal to about 90 wt %, or greater than or equal to about 95 wt %. In some embodiments, the weight percentage of the synthetic fibers in the filtration layer may be less than or equal to about 100 wt %, less than or equal to about 95 wt %, less than or equal to about 90 wt %, less than or equal to about 80 wt %, less than or equal to about 70 wt %, or less than or equal to about 50 wt %. Combinations of the above-referenced ranges are also possible (e.g., a weight percentage of greater than or equal to about 90 wt % and less than or equal to about 100 wt %). Other ranges are also possible. In some embodiments, a filtration layer includes 100 wt % of synthetic fibers. In some embodiments, a filtration layer includes the above-noted ranges of synthetic fibers with respect to the total weight of the filtration layer (e.g., including any resins). In some embodiments, a combination of filtration layers may have a percentage of synthetic fibers in one or more of the above-referenced ranges. Additionally, in embodiments in which more than one filtration layers are present in a media, each filtration layer may have a percentage of synthetic fibers having one or more of the above-referenced ranges. In another embodiment, the above-referenced ranges of fibers may apply to the entire filter media (which may include multiple filtration layers). The remaining fibers of the filtration layer and/or filter media may be non-synthetic fibers, such as glass fibers, glass wool fibers, and/or cellulose pulp fibers (e.g., wood pulp fibers).

In some embodiments, the fiber filtration layer 12 may include glass fibers (e.g., microglass fibers, chopped strand glass fibers, or a combination thereof). The type and size of glass fiber can also vary, but in an exemplary embodiment, the fiber is a microglass fiber, such as A-type or E-type glass fibers made using a rotary or flame attenuation process and having an average fiber diameter in the range of about 0.2 µm to 5 µm. Microglass fibers and chopped strand glass fibers are known to those of ordinary skill in the art. One of ordinary skill in the art is able to determine whether a glass fiber is microglass or chopped strand by observation (e.g., optical microscopy, electron microscopy). Microglass fibers may also have chemical differences from chopped strand glass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers. Such techniques impart the glass fibers with certain characteristics. In general, chopped strand glass fibers are drawn from bushing tips and cut into fibers in a process similar to textile production. Chopped strand glass fibers are produced in a more controlled manner than microglass fibers, and as a result, chopped strand glass fibers will generally have less variation in fiber diameter and length than microglass fibers. Microglass fibers are drawn from bushing tips and further subjected to flame blowing or rotary spinning processes. In some cases, fine microglass fibers may be made using a remelting process. In this respect, microglass fibers may be fine or coarse. As used herein, fine microglass fibers are less than or equal to 1 micron in diameter and coarse microglass fibers are greater than or equal to 1 micron in diameter.

The microglass fibers may have small diameters. For instance, in some embodiments, the average diameter of the microglass fibers may be less than or equal to about 10 microns, less than or equal to about 9 microns, less than or equal to about 7 microns, less than or equal to about 5 microns, less than or equal to about 3 microns, or less than or equal to about 1 micron. In some instances, the microglass fibers may have an average fiber diameter of greater than or equal to about 0.1 microns, greater than or equal to about 0.3 microns, greater than or equal to about 1 micron, greater than or equal to about 3 microns, or greater than or equal to about 7 microns. Combinations of the above-referenced ranges are also possible (e.g., greater than or equal to about 0.1 microns and less than or equal to about 10 microns, greater than or equal to about 0.1 microns and less than or equal to about 5 microns, greater than or equal to about 0.3 microns and less than or equal to about 3 microns). Other values of average fiber diameter are also possible. Average diameter distributions for microglass fibers are generally log-normal. However, it can be appreciated that microglass fibers may be provided in any other appropriate average diameter distribution (e.g., Gaussian distribution).

In some embodiments, the average length of microglass fibers may be less than or equal to about 10 mm, less than or equal to about 10 mm, less than or equal to about 8 mm, less than or equal to about 6 mm, less than or equal to about 5 mm, less than or equal to about 4 mm, less than or equal to about 3 mm, or less than or equal to about 2 mm. In certain embodiments, the average length of microglass fibers may be greater than or equal to about 1 mm, greater than or equal to about 2 mm, greater than or equal to about 4 mm, greater than or equal to about 5 mm, greater than equal to about 6 mm, or greater than or equal to about 8 mm. Combinations of the above referenced ranges are also possible (e.g., microglass fibers having an average length of greater than or equal to about 4 mm and less than about 6 mm). Other ranges are also possible.

In general, chopped strand glass fibers may have an average fiber diameter that is greater than the diameter of the microglass fibers. For instance, in some embodiments, the average diameter of the chopped strand glass fibers may be greater than or equal to about 5 microns, greater than or equal to about 7 microns, greater than or equal to about 9 microns, greater than or equal to about 11 microns, or greater than or equal to about 20 microns. In some instances, the chopped strand glass fibers may have an average fiber diameter of less than or equal to about 30 microns, less than or equal to about 25 microns, less than or equal to about 15 microns, less than or equal to about 12 microns, or less than or equal to about 10 microns. Combinations of the above-referenced ranges are also possible (e.g., greater than or equal to about 5 microns and less than or equal to about 12 microns). Other values of average fiber diameter are also possible. Chopped strand diameters tend to follow a normal distribution. Though, it can be appreciated that chopped strand glass fibers may be provided in any appropriate average diameter distribution (e.g., Gaussian distribution).

In some embodiments, chopped strand glass fibers may have a length in the range of between about 3 mm and about 25 mm (e.g., about 6 mm, or about 12 mm). In some embodiments, the average length of chopped strand glass fibers may be less than or equal to about 25 mm, less than or equal to about 20 mm, less than or equal to about 15 mm, less than or equal to about 12 mm, less than or equal to about 10 mm, less than or equal to about 7 mm, or less than or equal to about 5 mm. In certain embodiments, the average length of chopped strand glass fibers may be greater than or equal to about 3 mm, greater than or equal to about 5 mm, greater than or equal to about 10 mm, greater than or equal to about 12 mm, greater than equal to about 15 mm, or greater than or equal to about 20 mm. Combinations of the above referenced ranges are also possible (e.g., chopped strand glass fibers having an average length of greater than or equal to about 3 mm and less than about 25 mm). Other ranges are also possible.

It should be appreciated that the above-noted dimensions are not limiting and that the microglass and/or chopped strand fibers, as well as the other fibers described herein, may also have other dimensions.

In some embodiments, the average diameter of the glass fibers (e.g., regardless of whether the glass fibers are microglass, chopped strand, or another type) in the fiber filtration layer may be greater than or equal to about 1.5 microns, greater than or equal to about 2 microns, greater than or equal to about 2.5 microns, greater than or equal to about 3 microns, greater than or equal to about 4.5 microns, greater than or equal to about 5 microns, greater than or equal to about 6 microns, greater than or equal to about 7 microns, or greater than or equal to about 9 microns. In some instances, the average diameter of the glass fibers in the fiber filtration layer may have an average fiber diameter of less than or equal to about 10 microns, less than or equal to about 9 microns, less than or equal to about 7 microns, less than or equal to about 6 microns, less than or equal to about 5 microns, less than or equal to about 4.5 microns, less than or equal to about 3 microns, less than or equal to about 2.5 microns, or less than or equal to about 2 microns. Combinations of the above-referenced ranges are also possible (e.g., greater than or equal to about 1.5 microns and less than or equal to about 10 microns, greater than or equal to about 2 microns and less than or equal to about 9 microns, greater than or equal to about 2 microns and less than or equal to about 5 microns, greater than or equal to about 2.5 microns and less than or equal to about 4.5 microns).

In some embodiments, the average length of the glass fibers in the fiber filtration layer (e.g., regardless of whether the glass fibers are microglass, chopped strand, or another type) may be less than or equal to about 25 mm, less than or equal to about 20 mm, less than or equal to about 15 mm, less than or equal to about 12 mm, less than or equal to about 10 mm, less than or equal to about 8 mm, less than or equal to about 5 mm, less than or equal to about 3 mm, or less than or equal to about 1 mm. In certain embodiments, the average length of the glass fibers in the fiber filtration layer may be greater than or equal to about 0.05 mm, greater than or equal to about 0.1 mm, greater than or equal to about 0.3 mm, greater than or equal to about 0.5 mm, greater than equal to about 1 mm, greater than or equal to about 5 mm, greater than equal to about 10 mm, greater than or equal to about 15 mm, greater than equal to about 20 mm, greater than or equal to about 30 mm, or greater than or equal to about 40 mm. Combinations of the above referenced ranges are also possible (e.g., greater than or equal to about 1 mm and less than about 25 mm, greater than or equal to about 0.3 mm and less than about 20 mm, greater than or equal to about 0.1 mm and less than about 12 mm, greater than or equal to about 0.2 mm and less than about 6 mm, greater than or equal to about 0.5 mm and less than about 3 mm). Other ranges are also possible.

The resulting fiber filtration layer 12, as well as any additional filtration layer(s), can also have a variety of thicknesses, air permeabilities, basis weights, and filtration efficiencies depending upon the requirements of a desired application.

In one exemplary embodiment, the fiber filtration layer 12, as measured in a planar configuration, has a thickness in the range of about 6 mils to 22 mils; for example, between about 10 mils and about 18 mils, or between about 12 mils to 16 mils. Thickness, as referred to herein, is determined according to the Edana WSP 120.1 Standard on a planar layer under approximately 1 ounce load per square foot. Additionally, in embodiments in which more than one filtration layers are present in a media, each filtration layer may have a thickness having one or more of the above-referenced ranges.

The fiber filtration layer may have an air permeability in the range of about 30 CFM to 150 CFM. For example, the air permeability may be at least about 30 CFM, at least about 50 CFM, at least about 65 CFM, at least about 75 CFM, at least about 100 CFM, or at least about 125 CFM. In some embodiments, the air permeability of the fiber filtration layer may be less than or equal to about 150 CFM, less than or equal to about 125 CFM, less than or equal to about 100 CFM, less than or equal to about 75 CFM, less than or equal to about 65 CFM, or less than or equal about 50 CFM. Combinations of the above-referenced ranges are also possible (e.g., between about 30 CFM to 150 CFM, between about 65 CFM to 100 CFM). Other ranges are also possible. As determined herein, the air permeability is measured according to ASTM D737-04 (2012). The air permeability of a filtration layer or filter media is an inverse function of flow resistance and can be measured with a Frazier Permeability Tester. The Frazier Permeability Tester measures the volume of air per unit of time that passes through a unit area of sample at a fixed differential pressure across the sample. Permeability can be expressed in cubic feet per minute per square foot at a 0.5 inch water differential.

Support Layers

As also indicated above, the filter media 10 can include at least one support layer. In an exemplary embodiment, the filter media 10 includes a downstream support layer 14 disposed on the air outflow side O of the fiber filtration layer 12 and that is effective to hold the fiber filtration layer 12 in the waved configuration. The filter media 10 can also include an upstream support layer 16 that is disposed on the air entering side I of the fiber filtration layer 12 opposite to the downstream support layer 14. The upstream support layer 16 can likewise help maintain the fiber filtration layer 12 in a waved configuration. As indicated above, a person skilled in the art will appreciate that the filter media 10 can include any number of layers, and it need not include two support layers, or a top layer. In certain exemplary embodiments, the filter media 10 can be formed from a fiber filtration layer 12 and a single, adjacent support layer 14 or 16. In other embodiments, the filter media can include any number of additional layers arranged in various configurations. The particular number and type of layers will depend on the intended use of the filter media.

The support layers 14, 16 can be formed from a variety of fibers types and sizes. In an exemplary embodiment, the downstream support layer 14 is formed from fibers having an average fiber diameter that is greater than or equal to an average fiber diameter of the fiber filtration layer 12, the upstream support layer 16, and the top layer 18, if provided. In some cases, the upstream support layer 16 is formed from fibers having an average fiber diameter that is less than or equal to an average fiber diameter of the downstream support layer 14, but that is greater than an average fiber diameter of the fiber filtration layer 12 and the top layer 18. In certain exemplary embodiments, the downstream support layer 14 and/or the upstream support layer 16 can be formed from fibers having an average fiber diameter in the range of about 10 μm to 32 μm, or 12 μm to 32 μm. For example, the average fiber diameter of the downstream support layer and/or the upstream support layer may be in the range of about 18 μm to 22 μm. In some cases, the downstream and/or the upstream support layer may comprise relatively finer fibers than traditional support layers. For example, in some embodiments, the finer downstream and/or finer upstream support layer can be formed from fibers having an average fiber diameter in the range of about 9 μm to 18 μm. For example, the finer downstream and/or finer upstream support layer average fiber diameter may be in the range of about 12 μm to 15 μm.

The fibers of the support layer (e.g., the downstream support layer, the upstream support layer) may have an average fiber length of, for example, between about 1.0 inches and about 3.0 inches (e.g., between about 1.5 inches and about 2 inches). In some embodiments, the fibers of the support layer may have an average fiber length of less than or equal to about 3 inches, less than or equal to about 2.5 inches, less than or equal to about 2 inches, less than or equal to about 1.5 inch, or less than or equal to about 1.1 inches. In some embodiments, the fibers of the support layer may have an average fiber length of greater than or equal to about 1 inch, greater than or equal to about 1.5 inches, greater than or equal to about 2.0 inches, or greater than or equal to about 2.5. Combinations of the above referenced ranges are also possible (e.g., fibers having an average fiber length of greater than or equal to about 1.5 inches and less than about 2 inches). Other ranges are also possible.

Various materials can also be used to form the fibers of the support layers 14, 16, including synthetic and non-synthetic materials. In one exemplary embodiment, the support layers 14, 16 are formed from staple fibers, and in particular from a combination of binder fibers and non-binder fibers. One suitable fiber composition is a blend of at least about 20% binder fiber and a balance of non-binder fiber. A variety of types of binder and non-binder fibers can be used to form the media of the present invention. The binder fibers can be formed from any material that is effective to facilitate thermal bonding between the layers, and will thus have an activation temperature that is lower than the melting temperature of the non-binder fibers. The binder fibers can be monocomponent fibers or any one of a number of bicomponent binder fibers. In one embodiment, the binder fibers can be bicomponent fibers, and each component can have a different melting temperature. For example, the binder fibers can include a core and a sheath where the activation temperature of the sheath is lower than the melting temperature of the core. This allows the sheath to melt prior to the core, such that the sheath binds to other fibers in the layer, while the core maintains its structural integrity. This may be particularly advantageous in that it creates a more cohesive layer for trapping filtrate. The core/sheath binder fibers can be concentric or non-concentric, and exemplary core/sheath binder fibers can include the following: a polyester core/copolyester sheath, a polyester core/polyethylene sheath, a polyester core/polypropylene sheath, a polypropylene core/polyethylene sheath, a polyamide core/polyethylene sheath, and combinations thereof. Other exemplary bicomponent binder fibers can include split fiber fibers, side-by-side fibers, and/or "island in the sea" fibers.

The non-binder fibers can be synthetic and/or non-synthetic, and in an exemplary embodiment the non-binder fibers can be about 100 percent synthetic. In general, synthetic fibers are preferred over non-synthetic fibers for resistance to moisture, heat, long-term aging, and microbiological degradation. Exemplary synthetic non-binder fibers can include polyesters, acrylics, polyolefins, nylons, rayons, and combinations thereof. Alternatively, the non-binder fibers used to form the media can include non-synthetic fibers such as glass fibers, glass wool fibers, cellulose pulp fibers, such as wood pulp fibers, and combinations thereof.

The support layer may include a suitable percentage of synthetic fibers. For example, in some embodiments, the weight percentage of synthetic fibers in the support layer may be between about 80 wt % and about 100 wt % of all fibers in the support layer. In some embodiments, the weight percentage of synthetic fibers in the support layer may be greater than or equal to about 80 wt %, greater than or equal to about 90 wt %, or greater than or equal to about 95 wt %. In some embodiments, the weight percentage of the synthetic fibers in the support layer may be less than or equal to about 100 wt %, less than or equal to about 95 wt %, less than or equal to about 90 wt %, or less than or equal to about 85 wt %. Combinations of the above-referenced ranges are also possible (e.g., a weight percentage of greater than or equal to about 80 wt % and less than or equal to about 100 wt %). Other ranges are also possible. In some embodiments, a support layer includes 100 wt % of synthetic fibers. In some embodiments, a support layer includes the above-noted ranges of synthetic fibers with respect to the total weight of the support layer (e.g., including any resins). Additionally, in embodiments in which more than one filtration layers are present in a media, each filtration layer and/or support layer may have a percentage of synthetic fibers having one or more of the above-referenced ranges. In other embodiments, the above-referenced ranges of fibers may apply to the entire filter media (which may include multiple filtration layers). The remaining fibers of the filtration layer and/or filter media may be non-synthetic fibers, such as glass fibers, glass wool fibers, and/or cellulose pulp fibers (e.g., wood pulp fibers).

The support layers 14, 16 can also be formed using various techniques known in the art, including meltblowing, wet laid techniques, air laid techniques, carding, electrospinning, and spunbonding. In an exemplary embodiment, however, the support layers 14, 16 are carded or airlaid webs. The resulting layers 14, 16 can also have a variety of thicknesses, air permeabilities, and basis weights depending upon the requirements of a desired application. In one exemplary embodiment, the downstream support layer 14 and the upstream support layer 16, as measured in a planar configuration, each have a thickness in the range of about 8 mil to 30 mil (e.g., between about 12 mil to 20 mil), a basis weight in the range of about 10 gsm to 99 gsm (e.g., between about 22 gsm and about 99 gsm, between about 33 gsm and 70 gsm), and a mean flow pore size in the range of about 30 microns to 150 microns (e.g., between about 50 microns and about 120 microns).

For example, In some embodiments, the support layer(s) each have a thickness of at least about 8 mil, at least about 10 mil, at least about 12 mil, at least about 15 mil, at least about 20 mil, or at least about 25 mil. In certain embodiments, the support layer(s) may have a thickness of less than or equal to about 30 mil, less than or equal to about 25 mil, less than or equal to about 20 mil, less than or equal to about 15 mil, less than or equal to about 12 mil, or less than or equal to about 10 mil. Combinations of the above-referenced ranges are also possible (e.g., between about 8 mil and about 30 mil, between about 12 mil and about 20 mil). Other ranges are also possible. Thickness of the support layer(s) is determined as described herein according to the Edana WSP 120.1 Standard on a planar layer under approximately 1 ounce load per square foot.

In certain embodiments, the support layer(s) each have a basis weight of at least about 10 gsm, at least about 20 gsm, at least about 22 gsm, at least about 33 gsm, at least about 50 gsm, at least about 60 gsm, at least about 70 gsm, at least about 80 gsm, or at least about 90 gsm. In some embodiments, the support layer(s) each have a basis weight of less than or equal to about 99 gsm, less than or equal to about 90 gsm, less than or equal to about 80 gsm, less than or equal to about 70 gsm, less than or equal to about 60 gsm, less than or equal to about 50 gsm, less than or equal to about 33 gsm, less than or equal to about 22 gsm, or less than or equal to about 22 gsm. Combinations of the above-referenced ranges are also possible (e.g., between about 10 gsm and about 99 gsm, between about 33 gsm and about 70 gsm). Other ranges are also possible. As described herein, the basis weight of the support layer(s) is measured according to the Edana WSP 130.1 Standard.

In some embodiments, the support layer(s) have a mean flow pore size of at least about 30 microns, at least about 40 microns, at least about 50 microns, at least about 75 microns, at least about 100 microns, or at least about 120 microns. In certain embodiments, the support layer(s) have a mean flow pore size of less than or equal to about 150 microns, less than or equal to about 120 microns, less than or equal to about 100 microns, less than or equal to about 75 microns, less than or equal to about 50 microns, or less than or equal to about 40 microns. Combinations of the above-referenced ranges are also possible (e.g., between about 30 microns to 150 microns, between about 50 microns and about 120 microns). Other ranges are also possible. Mean flow pore size may be determined by a capillary flow porometer, as described above.

Outer or Cover Layer

As previously indicated, the filter media 10 can also optionally include one or more outer or cover layers disposed on the air entering side I and/or the air outflow side O. FIG. 1A illustrates a top layer 18 disposed on the air entering side I of the filter media 10. The top layer 18 can function as a dust loading layer and/or it can function as an aesthetic layer. In an exemplary embodiment, the top layer 18 is a planar layer that is mated to the filter media 10 after the fiber filtration layer 12 and the support layers 14, 16 are waved. The top layer 18 thus provides a top surface that is aesthetically pleasing. The top layer 18 can be formed from a variety of fiber types and sizes, but in an exemplary embodiment the top layer 18 is formed from fibers having an average fiber diameter that is less than an average fiber diameter of the upstream support layer 16 disposed immediately downstream of the top layer 18, but that is greater than an average fiber diameter of the fiber filtration layer 12. In certain exemplary embodiments, the top layer 18 is formed from fibers having an average fiber diameter in the range of about 5 μm to 20 μm. As a result, the top layer 18 can function as a dust holding layer without affecting the alpha value of the filter media 10, as will be discussed in more detail below.

As shown in FIG. 1B, the filter media 10B can alternatively or in addition include a bottom layer 18B disposed on the air outflow side O of the filter media 10B. The bottom layer 18B can function as strengthening component that provides structural integrity to the filter media 10B to help maintain the waved configuration. The bottom layer 18B can also function to offer abrasion resistance. This may be particularly desirable in ASHRAE bag applications where the outermost layer is subject to abrasion during use. The bottom layer 18B can have a configuration similar to the top layer 18, as discussed above. In an exemplary embodiment, however, the bottom layer 18B is the coarsest layer, i.e., it is formed from fibers having an average fiber diameter that is greater than an average fiber diameter of fibers forming all of the other layers of the filter media. One exemplary bottom layer is a spunbond layer, however various other layers can be used having various configurations.

Various materials can also be used to form the fibers of the outer or cover layer, including synthetic and non-synthetic materials. In one exemplary embodiment, the outer or cover layer, e.g., top layer 18 and/or bottom layer 18B, is formed from staple fibers, and in particular from a combination of binder fibers and non-binder fibers. One suitable fiber composition is a blend of at least about 20% binder fiber and a balance of non-binder fiber. A variety of types of binder and non-binder fibers can be used to form the media of the present invention, including those previously discussed above with respect to the support layers 14, 16.

The outer or cover layer, e.g., top layer 18 and/or any bottom layer, can also be formed using various techniques known in the art, including meltblowing, wet laid techniques, air laid techniques, carding, electrospinning, and spunbonding. In an exemplary embodiment, however, the top layer 18 is an airlaid layer and the bottom layer 18B is a spunbond layer. The resulting layer can also have a variety of thicknesses, air permeabilities, and basis weights depending upon the requirements of a desired application. In one exemplary embodiment, the outer or cover layer, as measured in a planar configuration, has a thickness in the range of about 2 mil to 50 mil, an air permeability in the range of about 100 CFM to 1200 CFM, and a basis weight in the range of about 10 gsm to 50 gsm.

A person skilled in the art will appreciate that, while FIG. 1A illustrates a four layer filter media, the media can include any number of layers in various configurations. Various layers can be added to enhance filtration, to provide support, to alter structure, or for various other purposes. By way of non-limiting example, the filter media can include various spunbond, wetlaid cellulose, drylaid synthetic nonwoven, wetlaid synthetic, and wetlaid microglass layers.

Method of Manufacturing

Some or all of the layers can be formed into a waved configuration using various manufacturing techniques, but in an exemplary embodiment the filtration layer 12 (e.g., fine fiber), any additional filtration layers, and at least one of the support layers 14, 16, are positioned adjacent to one another in a desired arrangement from air entering side to air outflow side, and the combined layers are conveyed between first and second moving surfaces that are traveling at different speeds, such as with the second surface traveling at a speed that is slower than the speed of the first surface. A suction force, such as a vacuum force, can be used to pull the layers toward the first moving surface, and then toward the second moving surface as the layers travel from the first to the second moving surfaces. The speed difference causes the layers to form z-direction waves as they pass onto the second moving surface, thus forming peaks and troughs in the layers. The speed of each surface can be altered to obtain the desired number of waves per inch. The distance between the surfaces can also be altered to determine the amplitude of the peaks and troughs, and in an exemplary embodiment the distance is adjusted between 0.025" to 4". For example, the amplitude of the peaks and waves may be between about 0.1" to 4.0", e.g., between about 0.1" to 1.0", between about 0.1" to 2.0", or between about 3.0" to 4.0". For certain applications, the amplitude of the peaks and waves may be between about 0.1" and 1.0", between about 0.1" and 0.5", or between about 0.1" and 0.3". The properties of the different layers can also be altered to obtain a desired filter media configuration. In an exemplary embodiment the filter media has about 2 to 6 waves per inch, with a height (overall thickness) in the range of about 0.025" to 2", however this can vary significantly depending on the intended application. For instance, in other embodiments, the filter media may have about 2 to 4 waves per inch, e.g., about 3 waves per inch. The overall thickness of the media may be between about 0.025" to 4.0", e.g., between about 0.1" to 1.0", between about 0.1" to 2.0" or between about 3.0" to 4.0". For certain applications, the overall thickness of the media may be between about 0.1" and 0.5", or between about 0.1" and 0.3". As shown in FIG. 1A, a single wave W extends from the middle of one peak to the middle of an adjacent peak. Thickness of the (waved) filter media can be determined as described above according to the Edana WSP 120.1 Standard under approximately 1 ounce load per 1 square inch pressure foot.

Figure 1C:
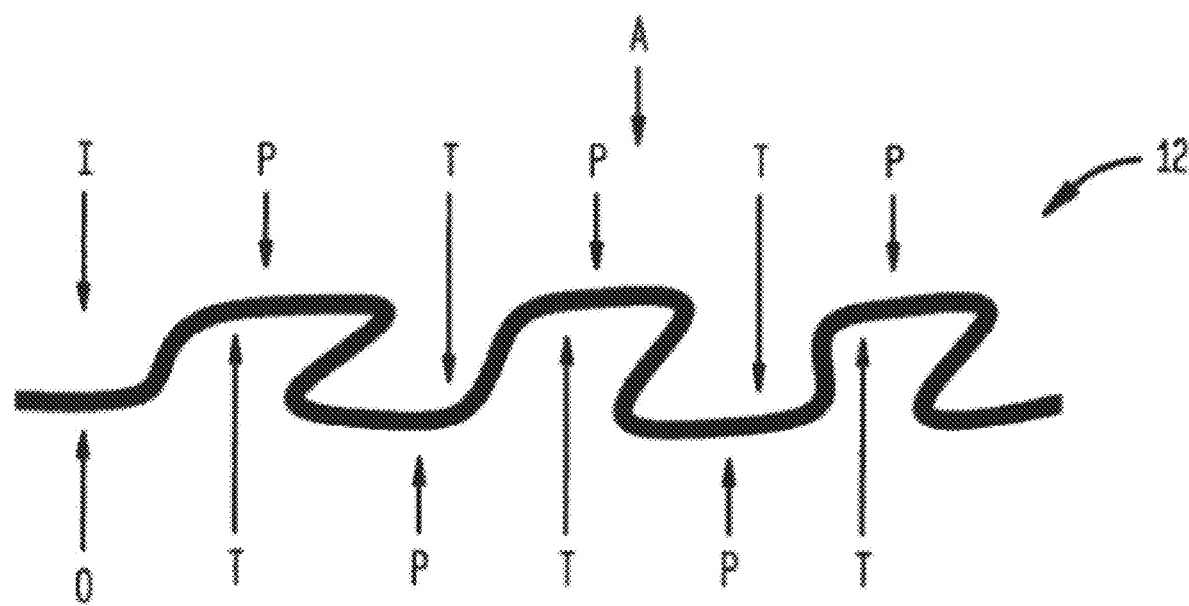
FIG. 1C is a side view illustration of one layer of the filter media of FIG. 1A.

In the embodiment shown in FIG. 1A, when the fiber filtration layer 12 and the support layers 14, 16 are waved, the resulting fiber filtration layer 12 will have a plurality of peaks P and troughs T on each surface (i.e., air entering side I and air outflow side O) thereof, as shown in FIG. 1C. The support layers 14, 16 will extend across the peaks P and into the troughs T so that the support layers 14, 16 also have waved configurations. A person skilled in the art will appreciate that a peak P on the air entering side I of the fiber filtration layer 12 will have a corresponding trough T on the air outflow side O. Thus, the downstream support layer 14 will extend into a trough T, and exactly opposite that same trough T is a peak P, across which the upstream support layer 16 will extend. Since the downstream support layer 14 extends into the troughs T on the air outflow side O of the fiber filtration layer 12, the downstream coarse layer 14 will maintain adjacent peaks P on the air outflow side O at a distance apart from one another and will maintain adjacent troughs T on the air outflow side O at a distance apart from one another. The upstream support layer 16, if provided, can likewise maintain adjacent peaks P on the air entering side I of the fiber filtration layer 12 at a distance apart from one another and can maintain adjacent troughs T on the air entry side I of the fiber filtration layer 12 at a distance apart from one another. As a result, the fiber filtration layer 12 has a surface area that is significantly increased, as compared to a surface area of the fiber filtration layer in the planar configuration. In certain exemplary embodiments, the surface area in the waved configuration is increased by at least about 50%, and in some instances as much as 120%, as compared to the surface area of the same layer in a planar configuration.

In embodiments in which the upstream and/or downstream support layers hold the fiber filtration layer in a waved configuration, it may be desirable to reduce the amount of free volume (e.g., volume that is unoccupied by any fibers) in the troughs. That is, a relatively high percentage of the volume in the troughs may be occupied by the support layer(s) to give the fiber layer structural support. For example, at least 95% or substantially all of the available volume in the troughs may be filled with the support layer and the support layer may have a solidity ranging between about 1% to 90%, between about 1% to 50%, between about 10% to 50%, or between about 20% to 50%. Additionally, as shown in the exemplary embodiments of FIG. 1A, the extension of the support layer(s) across the peaks and into the troughs may be such that the surface area of the support layer in contact with a top layer 18A is similar across the peaks as it is across the troughs. Similarly, the surface area of the support layer in contact with a bottom layer 18B (FIG. 1B) may be similar across the peaks as it is across the troughs. For example, the surface area of the support layer in contact with a top or bottom layer across a peak may differ from the surface area of the support layer in contact with the top or bottom layer across a trough by less than about 70%, less than about 50%, less than about 30%, less than about 20%, less than about 10%, or less than about 5%.

In certain exemplary embodiments, the downstream and/or upstream support layers 14, 16 can have a fiber density that is greater at the peaks than it is in the troughs; and, in some embodiments, a fiber mass that is less at the peaks than it is in the troughs. This can result from the coarseness of the downstream and/or upstream support layers 14, 16 relative to the fiber filtration layer 12. In particular, as the layers are passed from the first moving surface to the second moving surface, the relatively fine nature of the fiber filtration layer 12 will allow the downstream and/or upstream support layers 14, 16 to conform around the waves formed in the fiber filtration layer 12. As the support layers 14, 16 extend across a peak P, the distance traveled will be less than the distance that each layer 14, 16 travels to fill a trough. As a result, the support layers 14, 16 will compact at the peaks, thus having an increased fiber density at the peaks as compared to the troughs, through which the layers will travel to form a loop-shaped configuration.

Once the layers are formed into a waved configuration, the waved shape can be maintained by activating the binder fibers to effect bonding of the fibers. A variety of techniques can be used to activate the binder fibers. For example, if bicomponent binder fibers having a core and sheath are used, the binder fibers can be activated upon the application of heat. If monocomponent binder fibers are used, the binder fibers can be activated upon the application of heat, steam and/or some other form of warm moisture. A top layer 18 (FIG. 1A) and/or bottom layer 18B (FIG. 1B) can also be positioned on top of the upstream support layer 16 (FIG. 1A) or on the bottom of the downstream support layer 14B (FIG. 1B), respectively, and mated, such as by bonding, to the upstream support layer 16 or downstream support layer 14B simultaneously or subsequently. A person skilled in the art will also appreciate that the layers can optionally be mated to one another using various techniques other than using binder fibers. The layers can also be individually bonded layers, and/or they can be mated, including bonded, to one another prior to being waved.

A saturant can also optionally be applied to the material prior to drying the material. A variety of saturants can be used with the media of the present invention to facilitate the forming of the layers at a temperature that is less than the melting temperature of the fibers. Exemplary saturants can include phenolic resins, melamine resins, urea resins, epoxy resins, polyacrylate esters, polystyrene/acrylates, polyvinyl chlorides, polyethylene/vinyl chlorides, polyvinyl acetates, polyvinyl alcohols, and combinations and copolymers thereof that are present in an aqueous or organic solvent.

In some embodiments, the resulting media can also have a gradient in at least one, and optionally all, of the following properties: binder and non-binder fibers composition, fiber diameter, solidity, basis weight, and saturant content. For example, in one embodiment, the media can have a lightweight, lofty, coarse-fibered, lightly bonded and lightly saturated sheet upstream, and a heavier, denser, fine-fibered, heavily bonded and heavily saturated sheet downstream. This allows the coarser particles to be trapped in the upstream layer, preventing early saturation of the bottom layer. In other embodiments, the upstream-most layer can be lighter and/or loftier than the downstream-most layer. That is, the upstream layer can have a solidity (e.g., the solid volume fraction of fibers in the layer) and a basis weight that is less than that of the downstream layer. Additionally, in embodiments where the filter media includes a saturant, the media can have a gradient with respect to the amount of saturant in the upstream-most and downstream-most layers. One skilled in the art will appreciate the variety of properties that the layers of the media can have.

An electrostatic charge can also optionally be imparted to the filter media, or to various layers of the media, to form an electret fiber layer. For example, a charge may be imparted to a fiber filtration layer prior to joining with one or more support layers. In another embodiment, a charge is imparted to a filter media including more than one layer, e.g., a fiber filtration layer and one or more support layers. Depending on the materials used to form each of the layers, the amount of charge, and the method of charging, the charge may either remain in one or more of the layers or dissipate after a short period of time (e.g., within hours). A variety of techniques are well known to impart a permanent dipole to the polymer web in order to form electret filter media. Charging can be effected through the use of AC and/or DC corona discharge units and combinations thereof. The particular characteristics of the discharge are determined by the shape of the electrodes, the polarity, the size of the gap, and the gas or gas mixture. Charging can also be accomplished using other techniques, including friction-based charging techniques.

In some embodiments, the fiber filtration layer may be made hydrophobic or hydrophilic. As described further below, in some cases, the hydrophilicity of a filtration layer may alter the magnitude of the decrease in air permeability of an NaCl loaded media as compared to unloaded media, in humid environments. In certain embodiments, an NaCl loaded media comprising a hydrophilic fiber filtration layer may have a relatively low decrease in air permeability after exposure to humid environments.

Air permeability after humidity loading, as referred to herein, is determined by performing a humidity challenge after loading a 100 $cm^2$ sample with NaCl aerosol (23 mg $NaCL/m^3$ air) of approximately 0.3 micron particle for 30 minutes using an automated filter testing unit (e.g., TSI 8130 CertiTest™ from TSI, Inc.) equipped with a sodium chloride generator. Samples (e.g., filter media in a waved configuration including a fiber filtration layer and a support layer) are loaded at a face velocity of 14.1 cm/sec for 30 minutes. Once loaded with NaCl, the samples are placed into a sample holder connected to an Frazier air permeability machine and enclosed in a chamber containing a steam generator to generate humidity. A hygrometer probe is inserted into the box to measure the temperature and humidity within the chamber. At the beginning of the test the relative humidity in the chamber is 50% and the test is conducted by taking initial air permeability readings at pressure drop of 0.5" water column, after which the steam generator is turned on and air permeability and humidity readings are taken every 30 seconds. Once humidity reaches 90% (or, in some cases, 95%), the readings are continued for approximately 12 minutes, after which the steam generator is turned off. Readings are continued until the relative humidity in the chamber returns to its level at the beginning of the test (i.e., 50%), at which point the air permeability has stabilized. The percent decrease in air permeability after humidity loading is the difference between the maximum air permeability value (which is the air permeability value measured when the relative humidity has returned to its level at the beginning of the test, i.e., 50%) minus the minimum air permeability value (at either 90% or 95%, as the case may be) expressed as a percentage of the maximum air permeability value.

In some embodiments, the fiber filtration layer is hydrophilic and the decrease in air permeability after humidity loading may be less than or equal to 20%, less than or equal to 19%, less than or equal to 18%, less than or equal to 17%, less than or equal to 16%, less than or equal to 15%, less than or equal to 14%, less than or equal to 13%, less than or equal to 12%, less than or equal to 11%, less than or equal to 10%, less than or equal to 9%, less than or equal to 8%, less than or equal to 7%, or less than or equal to 6%. In certain embodiments, the decrease in air permeability after humidity loading is greater than or equal to 5%, greater than or equal to 6%, greater than or equal to 7%, greater than or equal to 8%, greater than or equal to 9%, greater than or equal to 10%, greater than or equal to 11%, greater than or equal to 12%, greater than or equal to 13%, greater than or equal to 14%, greater than or equal to 15%, greater than or equal to 16%, greater than or equal to 17%, greater than or equal to 18%, or greater than or equal to 19%. Combinations of the above-referenced ranges are also possible (e.g., less than or equal to 20% and greater than or equal to 5%, less than or equal to 15% and greater than or equal to 10%). Other ranges are also possible.

In some cases, the fiber filtration layer may be hydrophobic. In certain embodiments, the fiber filtration layer may be hydrophilic. Those skilled in the art would be capable of selecting suitable methods for making the fiber filtration layer hydrophobic or hydrophilic including, but not limited to, the addition of a hydrophobic or a hydrophilic coating, inclusion of additives (e.g., during extrusion of the fibers), and/or selecting of hydrophobic or hydrophilic fiber materials. In some cases, the fibers of the support layer may also be selectively made hydrophobic or hydrophilic. For example, such support layers could be carded or airlaid webs with topical finishes applied to the fibers before processing, and/or the fibers could be selected based on their hydrophobic or hydrophilic properties.

The decrease in air permeability after humidity loading of a filter media comprising a hydrophilic fiber filtration layer may be less than the decrease in air permeability after humidity loading of a filter media comprising a hydrophobic fiber filtration layer.

In some embodiments, a layer (e.g., a fiber filtration layer, a support layer) of the filter media (and/or at least a portion of the fibers of the layer) may be modified such that at least a portion of a surface of the layer (and/or at least a portion of the surface of the fibers of the layer) is hydrophilic. In certain embodiments, one or both of the upstream and the downstream surfaces of a layer (e.g., a fiber filtration layer, a support layer) are modified. In other embodiments, the layer (e.g., fiber filtration layer, a support layer) is modified at a depth beneath the surface, and in some cases, throughout the thickness of the layer. In certain embodiments, a layer is modified using chemical vapor deposition, topical application of a coating (e.g., via a spray method, a dip method, flexographic or reverse roll application), incorporation of hydrophilic melt additives, incorporation of hydrophilic fibers, or combinations thereof. Other (surface) modification techniques may also be used. For instance, the layer (e.g., fiber filtration layer, support layer) may comprise a chemical vapor deposition coating.

In some embodiments, the filter media and/or one or more layers of the filter media (e.g., a fiber filtration layer) to be modified (e.g., such that at least a surface of the fiber filtration layer is hydrophilic) may include one or more features, materials, components, and/or methods described in co-owned U.S. Pat. No. 7,883,562, entitled "Waved filter Media and Elements", issued Feb. 8, 2011, which is incorporated herein by reference in its entirety.

In some embodiments, the hydrophilic modification of a layer may be conducted at any suitable time. For example, at least a surface of a layer (e.g., fiber filtration layer, support layer) may be modified to be hydrophilic after formation of the layer and/or during formation of the layer (e.g., during a meltblown process, an electrospinning process, etc., as described herein). In certain embodiments, at least a surface of the layer may be modified to be hydrophilic during and/or after formation of the waved configuration of the layer.

In some embodiments, at least one surface of the layer (e.g., fiber filtration layer, support layer) may be modified to make the surface hydrophilic or increase the hydrophilicity of the surface. For example, a hydrophilic surface having a water contact angle of about 60° may be modified to have a water contact angle of about 15°. In another example, a hydrophobic surface having a water contact angle of about 100° may be modified to have a water contact angle of less than 90° (e.g., a water contact angle of less than 60°).

As used herein, the term "hydrophilic" refers to material that has a water contact angle of less than 90 degrees. A material generally becomes more hydrophilic as the water contact angle decreases. Accordingly, a "hydrophilic surface" may refer to a surface that has a water contact angle of less than 90 degrees. In some embodiments, the surface may be modified to be hydrophilic such that the water contact angle is less than 90 degrees, less than or equal to about 80 degrees, less than or equal to about 75 degrees, less than or equal to about 70 degrees, less than or equal to about 65 degrees, less than or equal to about 60 degrees, less than or equal to about 55 degrees, less than or equal to about 50 degrees, less than or equal to about 45 degrees, less than or equal to about 40 degrees, less than or equal to about 35 degrees, less than or equal to about 30 degrees, less than or equal to about 25 degrees, less than or equal to about 20 degrees, or less than or equal to about 15 degrees. In some embodiments, the water contact angle is greater than or equal to about 0 degrees, greater than or equal to about 5 degrees, greater than or equal to about 10 degrees, greater than or equal to about 15 degrees, greater than or equal to about 20 degrees, greater than or equal to about 25 degrees, greater than or equal to about 35 degrees, greater than or equal to about 45 degrees, or greater than about 60 degrees. Combinations of the above-referenced ranges are also possible (e.g., greater than or equal to about 0 degrees and less than about 90 degrees, greater than or equal to about 0 degrees and less than about 60 degrees). In an exemplary embodiment, the contact angle of the surface (e.g., after modification) is less than or equal to 60 degrees. The water contact angle may be measured using ASTM D5946-04. The water contact angle is the angle between the surface (e.g., a surface of the fiber filtration layer) and the tangent line drawn to the water droplet surface at the three-phase point, when a liquid drop is resting on a plane solid surface. A contact angle meter or goniometer can be used for this determination. In some embodiments, the hydrophilicity of the surface may be such that a water droplet placed on the surface completely wets the surface (e.g., the water droplet is completely absorbed into the material making the water contact angle 0).

In some embodiments, the decrease in water contact angle of at least one surface of the layer upon modification as described herein is greater than or equal to about 0 degree, greater than or equal to 1 degree, greater than or equal to about 2 degrees, greater than or equal to about 5 degrees, greater than or equal to about 10 degrees, greater than or equal to about 15 degrees, greater than or equal to about 20 degrees, greater than or equal to about 25 degrees, greater than or equal to about 35 degrees, greater than or equal to about 45 degrees, greater than or equal to about 60 degrees, greater than or equal to about 75 degrees, greater than or equal to about 80 degrees, or greater than or equal to about 90 degrees as compared to the water contact angle of the at least one surface prior to modification. In certain embodiments, the decrease in water contact angle of at least one surface of the layer upon modification is less than or equal to about 100 degrees, less than or equal to about 90 degrees, less than or equal to about 80 degrees, less than or equal to about 75 degrees, less than or equal to about 70 degrees, less than or equal to about 65 degrees, less than about 60 degrees, less than or equal to about 55 degrees, less than or equal to about 50 degrees, less than or equal to about 45 degrees, less than or equal to about 40 degrees, less than or equal to about 35 degrees, less than or equal to about 30 degrees, less than or equal to about 25 degrees, less than or equal to about 20 degrees, less than or equal to about 15 degrees, less than or equal to about 10 degrees, less than or equal to about 5 degrees, or less than or equal to about 2 degrees as compared to the water contact angle of the at least one surface prior to modification. Combinations of the above-referenced ranges are also possible (e.g., greater than or equal to 0 degrees and less than or equal to 100 degrees). Other ranges are also possible.

In some embodiments, the fiber filtration layer may comprise fibers that may be modified such that at least a surface of the fiber filtration layer comprising said fibers is hydrophilic. In some cases, the fibers may be hydrophilic. In some embodiments, the fibers may be hydrophobic and may be modified to be hydrophilic. Non-limiting examples of fibers that may be may be modified (e.g., to enhance or impart hydrophilicity) may comprise a polymer such as polyolefins (e.g., polypropylene, polyethylene, polybutene, copolymers of olefinic monomers such as ethylene or propylene), polyesters (e.g., polybutylene terephthalate (PBT), polyethylene terephthalate (PET), CoPET, polylactic acid (PLA)), polyamides (e.g., nylons such as polyamid 6 (PA6), polyamid 11 (PA 11), aramids), polycarbonates, and combinations thereof (e.g., polylactic acid/polystyrene, PEN/PET polyester, copolyamides). In cases in which the fiber is hydrophilic (e.g., polylactic acid, PA6), the fiber may be modified to enhance the hydrophilicity of the fiber. In an exemplary embodiment, the fiber may have a water contact angle of greater than 60 degrees (e.g., greater than 60 degrees and less than 90 degrees) and is modified such that the water contact angle is less than or equal to 60 degrees (e.g., greater than or equal to 0 degree and less than or equal to 60 degrees).

In some embodiments, a gas may be used to modify the hydrophilicity of at least one surface of the layer (e.g., the filtration layer, the support layer). For example, after layer formation, the layer may be exposed to a gaseous environment. In some such cases, the molecules in the gas may react with material (e.g., fibers, resin, additives) on the surface of the layer to form functional groups, such as charged moieties, and/or to increase the oxygen content on the surface of the layer. Non-limiting examples of functional groups include hydroxyl, carbonyl, ether, ketone, aldehyde, acid, amide, acetate, phosphate, sulfite, sulfate, amine, nitrile, and nitro groups. Non-limiting examples of gases that may be reacted with at least one surface of the layer includes $CO_2$, $SO_2$, $SO_3$, $NH_3$, $N_2H_4$, $N_2$, $O_2$, $H_2$, He, Ar, NO, air and combinations thereof.

In certain embodiments, a coating (e.g., a polymeric coating) may be used to modify the hydrophilicity of at least a surface of the layer (e.g., the fiber filtration layer, the support layer). For example, after layer formation, the coating may be applied to at least a surface of the layer. In certain embodiments, the coating comprises an acrylate (e.g., acrylamide, (Hydroxyethyl)methacrylate), carboxylic acid (e.g., acrylic acid, citric acid), a sulfonate (e.g., 1,3-propane sultone, N-hydroxysulfosuccinimide, methyl trifluoromethanesulfonate), a polyol (e.g., glycerin, pentaerythritol, ethylene glycol, propylene glycol, sucrose), an amine (e.g., allylamine, ethyleneimine, oxazoline), a silicon-containing compound (e.g., tetraethyl orthosilicate, hexamethyldisiloxane, silane), and combinations thereof. In some embodiments, the coating may be applied independently, as a mixture of two or more coatings, or sequentially (e.g., coating a first coating with a second coating).

In some embodiments, a wetting agent (e.g., a surfactant) may be used to modify the hydrophilicity of at least one surface of the layer. For example, after layer formation, the wetting agent may be applied to at least a surface of the layer. Non-limiting examples of suitable wetting agents include anionic surfactants (e.g., sodium dioctylsulfosuccinate, disodium salts of alkyl polyglucoside esters), nonionic surfactants (e.g., alkyl phenol ethoxylates, alcohol ethoxylates, polyglycerol esters, polyglucosides), cationic surfactants (e.g., quaternary ammonium compounds of the general formula $R^1R^2R^3R^4N^+X^-$ where each of $R^1$, $R^2$, $R^3$, and $R^4$ represent the same or different alkyl groups and $X^-$ is a halide such as a chloride ion), amphoteric surfactants (e.g., surfactants comprising cationic and anionic groups such as N-alkyl betaines), and combinations thereof.

In some embodiments, the layer may be dipped in a material (e.g., a coating, a surfactant). In certain embodiments, the material may be sprayed on the layer. The weight percent of the material (e.g., coating, surfactant, functional group) used to modify at least one surface of the layer (e.g., the fiber filtration layer, the support layer) may be greater than or equal to about 0.0001 wt %, greater than or equal to about 0.0005 wt %, greater than or equal to about 0.001 wt %, greater than or equal to about 0.005 wt %, greater than or equal to about 0.01 wt %, greater than or equal to about 0.05 wt %, greater than or equal to about 0.1 wt %, greater than or equal to about 0.5 wt %, greater than or equal to about 1 wt %, greater than or equal to about 2 wt %, or greater than or equal to about 4 wt % versus the total weight of the layer. In some cases, the weight percentage of the material used to modify at least one surface of the layer may be less than or equal to about 5 wt %, less than or equal to about 3 wt %, less than or equal to about 1 wt %, less than or equal to about 0.5 wt %, less than or equal to about 0.1 wt %, less than or equal to about 0.05 wt %, less than or equal to about 0.01 wt %, or less than or equal to about 0.005 wt % versus the total weight of the layer. Combinations of the above-referenced ranges are also possible (e.g., a weight percentage of material of greater than or equal to about 0.0001 wt % and less than about 5 wt %). Other ranges are also possible. The weight percentage of material in the layer is based on the dry solids of the layer and can be determined by weighing the layer before and after the modification of the surface as described herein.

In some cases, a melt additive may be incorporated into a fiber and/or the layer to enhance the hydrophilicity of the layer. For example, in certain embodiments, a melt additive may be used to modify the hydrophilicity of at least a surface of the layer (e.g., the fiber filtration layer, the support layer). In some cases, the melt additive (e.g., a hydrophilic melt additive) may be blended with one or more fibers of the layer (e.g., during formation of the fibers and/or formation of the layer). Non-limiting examples of suitable (hydrophilic) melt additives include monoglycerides, mixed glycerides, di-fatty acid esters of polyethylene oxide, ethoxylated castor oil, blends of glycerol oleate esters and alkyl phenol ethoxylates, and polyethylene glycol esters of fatty acids. Other hydrophilic melt additives are also possible.

In some cases, the melt additive may comprise a preblended masterbatch melt additive. Preblended masterbatch melt additives are known in the art and one of ordinary skill would be capable of incorporating preblended masterbactch melt additives into a fiber filtration layer such that at least a surface of the fiber filtration layer is hydrophilic, based upon the teachings of this specification.

The weight percent of the melt additive (or preblended masterbatch melt additive) used to modify at least one surface of the layer may be greater than or equal to about 0.0001 wt %, greater than or equal to about 0.0005 wt %, greater than or equal to about 0.001 wt %, greater than or equal to about 0.005 wt %, greater than or equal to about 0.01 wt %, greater than or equal to about 0.05 wt %, greater than or equal to about 0.1 wt %, greater than or equal to about 0.5 wt %, greater than or equal to about 1 wt %, greater than or equal to about 2 wt %, greater than or equal to about 4 wt %, greater than or equal to about 6 wt %, or greater than or equal to about 8 wt % versus the total weight of the layer. In some cases, the weight percentage of the melt additive used to modify at least one surface of the layer may be less than or equal to about 10 wt %, less than or equal to about 8 wt %, less than or equal to about 5 wt %, less than or equal to about 3 wt %, less than or equal to about 1 wt %, less than or equal to about 0.5 wt %, less than or equal to about 0.1 wt %, less than or equal to about 0.05 wt %, less than or equal to about 0.01 wt %, or less than or equal to about 0.005 wt % versus the total weight of the layer. Combinations of the above-referenced ranges are also possible (e.g., a weight percentage of material of greater than or equal to about 0.0001 wt % and less than about 10 wt %, or greater than or equal to about 0.0001 wt % and less than about 5 wt %). Other ranges are also possible. The weight percentage of material in the layer is based on the dry solids of the layer and can be determined by thermogravimetric analysis.

The filter media can also be pleated after it is formed into the waved configuration, and various exemplary configurations will be discussed in more detail below. A person skilled in the art will appreciate that virtually any pleating technique known in the art can be used to pleat the waved filter media. Typically, a filter media is pleated by forming a plurality of parallel score lines in the media and forming folds at each score line.

Filter Media Properties

As indicated above, the properties of the resulting filter media can vary depending on the intended use. In some embodiments, the mean flow pore size of the fiber filtration layer is effective to improve the performance (e.g., reduced air permeability decrease) of a filter media in relatively high humidity environments.

In some embodiments, the filter media described herein is classified as a G1, G2, G3, G4, M5, M6, F7, F8, or F9 filter media. The average efficiency and minimum efficiency ranges for 0.4 micron or larger DEHS particles for these classifications are listed in Table 1. As stated below, the testing is performed until a maximum final pressure drop of 250 Pa or 450 Pa, according to the EN779-2012 standard described above.

TABLE 1

| Group | Class | Final test pressure drop Pa | Average arrestance ($A_m$) of synthetic dust % | Average efficiency ($E_m$) of 0.4 µm particles % | Minimum Efficiency* of 0.4 µm particles % |
|---|---|---|---|---|---|
| Coarse | G1 | 250 | $50 \leq A_m < 65$ | — | — |
|  | G2 | 250 | $65 \leq A_m < 80$ | — | — |
|  | G3 | 250 | $80 \leq A_m < 90$ | — | — |
|  | G4 | 250 | $90 \leq A_m$ | — | — |
| Medium | M5 | 450 | — | $40 \leq E_m < 60$ | — |
|  | M6 | 450 | — | $60 \leq E_m < 80$ | — |
| Fine | F7 | 450 | — | $80 \leq E_m < 90$ | 35 |
|  | F8 | 450 | — | $90 \leq E_m < 95$ | 55 |
|  | F9 | 450 | — | $95 \leq E_m$ | 70 |

The resulting media can also have a variety of thicknesses, air permeabilities, basis weights, and initial efficiencies depending upon the requirements of a desired application. Thickness, as referred to herein, is determined according to the Edana WSP 120.1 Standard using an appropriate caliper gage. Basis weight, as referred to herein, is determined according to the Edana WSP 130.1 Standard.

For example, in one embodiment, the resulting media can have a thickness $t_m$, as shown in FIG. 1A, in the range of about 0.025" to 4", an amplitude of the peaks and waves of between about 0.025" to 4" (e.g., between about 0.1" to 1.0", between about 0.1" to 2.0", or between about 3.0" to 4.0" in some applications, between about 0.1" and 0.5", or between about 0.1" and 0.3" in other applications), and an air permeability in the range of about 30 CFM to 400 CFM (e.g., between about 50 CFM to 120 CFM, or between about 70 CFM to 90 CFM). The resulting media can also have a basis weight in the range of about 125 gsm to 250 gsm (e.g., about 150 to 250 gsm, or about 135 gm to 160 gsm), and/or a NaCl loading of less than about 25 mm $H_2O$ after loading approximately 60 mg/100 cm² of about 0.3 µm particles at 5.3 cm/s face velocity (e.g., less than about 20 mm $H_2O$).

Filter Elements

As previously indicated, the filter media disclosed herein can be incorporated into a variety of filter elements for use in various applications, including both liquid and air filtration applications. Exemplary uses include ASHRAE bag filters, pleatable HVAC filters, gas turbine bag filters, liquid bag filter media, dust bag house filters, residential furnace filters, paint spray booth filters, face masks (e.g., surgical face masks and industrial face masks), cabin air filters, commercial ASHRAE filters, respirator filters, automotive air intake filters, automotive fuel filters, automotive lube filters, room air cleaner filters and vacuum cleaner exhaust filters. The filter elements can have various configurations, and certain exemplary filter element configurations are discussed in more detail below. Other exemplary filter elements include, by way of non-limiting example, radial filter elements that include cylindrical filter media disposed therein, micron-rater vessel bag filters (also referred to as sock filters) for liquid filtration, face masks, etc.

Panel Filter

In one exemplary embodiment, the filter media can be used in a panel filter. In particular, the filter media can include a housing disposed therearound. The housing can have various configurations, and the particular configuration can vary based on the intended application. The housing may be in the form of a frame that is disposed around the perimeter of the filter media. The frame may have a generally rectangular configuration such that it surrounds all four sides of a generally rectangular filter media 10, however the particular shape can vary. The frame can be formed from various materials, including cardboard, metal, polymers, etc. In certain exemplary embodiments, the frame can have a thickness that is about 12" or less, or about 2" or less. In another embodiment, the frame can be formed from the edges of the filter media. In particular, a perimeter of the filter media 10' can be thermally sealed to form a frame therearound. The panel filter can also include a variety of other features known in the art, such as stabilizing features for stabilizing the filter media relative to the frame, spacers, etc.

In use, the panel filter element can be used in a variety of applications, including commercial and residential HVAC (e.g., furnace filters); automotive passenger cabin air; automotive air intake; and paint spray booth filters. The particular properties of the filter element can vary based on the intended use, but in certain exemplary embodiments, the filter element has a MERV rating in the range of 7 to 20, and may be, for example, greater than about 13, greater than about 15, greater than about 17, or greater than about 19. The filter element may have a pressure drop in the range of about 0.1" to 5" $H_2O$, e.g., between about 0.1" to 1" $H_2O$.

Pleated Filter

The waved filter media can also be pleated and used in a pleated filter. As previously discussed, the waved media, or various layers thereof, can be pleated by forming score lines at a predetermined distance apart from one another, and folding the media. A person skilled in the art will appreciate, however, that other pleating techniques can be used. Once the media is pleated, the media can be incorporated into a housing. The media can have any number of pleats depending on the size of the frame and the intended use. In certain exemplary embodiment, the filter media has 1-2 pleats per inch, and a pleat height in the range of about 0.75" to 2". However, some applications utilize peaks having a height up to 12".

In order to facilitate pleating, the filter media can be self-supporting, i.e., it can have a stiffness that allows pleating. In certain exemplary embodiments, the minimum stiffness of the filter media is about 200 mg with Gurley Stiffness tester to enable pleating. Alternatively, or in addition, the filter media can include various stiffening elements (e.g., stabilizing straps, screen backing, and the like).

In use, the pleated waved filter element can be used in a variety of applications, including pleatable HVAC filters, residential furnace filters, cabin air filters, commercial ASHRAE filters, automotive air intake filters, automotive fuel filters, automotive lube filters, room air cleaner filters, and vacuum cleaner exhaust filters. The particular properties of the filter element can vary based on the intended use, but in certain exemplary embodiments, the filter element has a MERV rating in the range of 7 to 20. For example, the MERV rating may be greater than about 13, greater than about 15, greater than about 17, or greater than about 19. The filter element may have a pressure drop in the range of about 0.1" to 5" $H_2O$, e.g., between about 0.1" to 1" $H_2O$. The filter media can also have a thickness before pleating of about 0.5" of less, and a thickness after pleating of about 2" or less. However, in certain application the thickness after pleating can be up to 12".

Bag/Pocket Filter

In yet another embodiment, the filter media can be incorporated into a bag or pocket filter for use in heating, air conditioning, ventilation, gas turbine filtration, and/or refrigeration; and micron rated liquid filter bags. The bag or pocket filter can be formed by placing two filter media together (or folding a single filter media in half), and mating three sides (or two if folded) to one another such that only one side remains opens, thereby forming a pocket inside the filter. In some embodiments, multiple filter pockets can be attached to a frame to form a filter element. Each pocket can be positioned such that the open end is located in the frame, thus allowing air to flow into each pocket. The frame can include rectangular rings that extend into and retain each pocket. A person skilled in the art will appreciate that the frame can have virtually any configuration, and various mating techniques known in the art can be used to couple the pockets to the frame. Moreover, the frame can include any number of pockets, but bag filters typically include between 6 and 10 pockets.

The particular properties of the filter element can vary based on the intended use, but in certain exemplary embodiments, the filter element has a MERV rating in the range of about 7 to 20 (e.g., 13 to 20). For example, the MERV rating may be greater than about 13, greater than about 15, greater than about 17, or greater than about 19. The filter element may have a pressure drop in the range of about 0.1" to 5" $H_2O$, e.g., between about 0.1" to 1" $H_2O$. The filter media can also have a thickness that is about 2" or less, or about 0.5" or less, however the thickness can vary depending on the intended application.

By way of non-limiting example, a standard 8 pocket ASHRAE bag filter typically has a 30" deep pocket in a 24"×24" frame, and yields 80 sq. ft. of media. An ASHRAE bag filter having the same dimensions, but utilizing a waved filter media according to the present invention, will yield 176 sq. ft. of media.

Facemask

In yet another embodiment, the filter media can be incorporated into a personal protective filtration device, such as a facemask, that is designed to remove contaminants from breathable air. In one embodiment, the filter media is used to form an industrial facemask designed for use in the workplace. The facemask may include, for example, an outer structural support layer, a filtration layer, and an inner structural support layer, although any suitable combination of layers can be used. Each of the layers may be charged or uncharged. Each of the layers may be hydrophobic or hydrophilic. The structural support layers may be nonwoven layers that are thermally moldable under suitable conditions, e.g., at a temperature of about 105-110° C. for 6-8 seconds. The filtration layers may be formed from meltblown or fiberglass materials. In one set of embodiments, a facemask has a filter area of approximately 170 $cm^2$, which is standard in the United States, or an area of approximately 150 $cm^2$, which may be standard in other areas of the world.

In another embodiment, the filter media is used in a surgical facemask. A surgical facemask includes a personal protective filtration device typically worn by medical personnel for two primary reasons: to prevent the transfer of germs from medical personnel to patient (and vice versa), and to protect medical personnel from the strike of insulting bodily fluids. A surgical facemask may include, for example, an outer structural support layer, a filtration layer, and an inner structural support layer, although any suitable combination of layers can be used. Each of the layers may be charged or uncharged. In some embodiments, the structural support layers are polypropylene spunbond and the filtration layers are formed from meltblown or fiberglass materials. The filter media may be folded for larger coverage area, and may include a filter area of, for example, 200-1000 $cm^2$.

The following non-limiting examples serve to further illustrate the present invention:

Example 1

This example illustrates the importance of mean flow pore size on filtration performance according to some embodiments described herein.

Samples A-G are melt blown fiber filtration layer samples (in a planar configuration without support layer(s)) designed to have a minimum DEHS efficiency of at least 25%). A number of properties of the samples were measured and the results are shown in Table 2.

TABLE 2

| Sample | Avg. Basis Weight (gsm) | Mean flow pore size (microns) |
| --- | --- | --- |
| A | 9.3 | 10.43 |
| B | 18.6 | 16.38 |
| C | 15.6 | 12.83 |
| D | 14.2 | 12.54 |
| E | 15.8 | 13.56 |
| F | 4.2 | 6.1 |
| G | 8.7 | 10.96 |

Transition salt load testing was conducted on the samples following the protocol described above.

FIG. 2A shows a plot of the Resistance (mm $H_2O$) vs. NaCl loading (gsm) for Samples A and B obtained from the transition salt load testing. The plot also shows the cake loading lines and initial depth loading lines for Samples A and B. As described above, the transition salt load is defined as the value of NaCl load per unit area (gsm) at the intersection of the initial depth loading line and the cake loading line. Sample A (with a mean flow pore size of 10.43 microns) had a transition salt load of about 1.2, and Sample B (with a mean flow pore size of 16.38 microns) had a transition salt load of about 3.6.

Figure 2B:
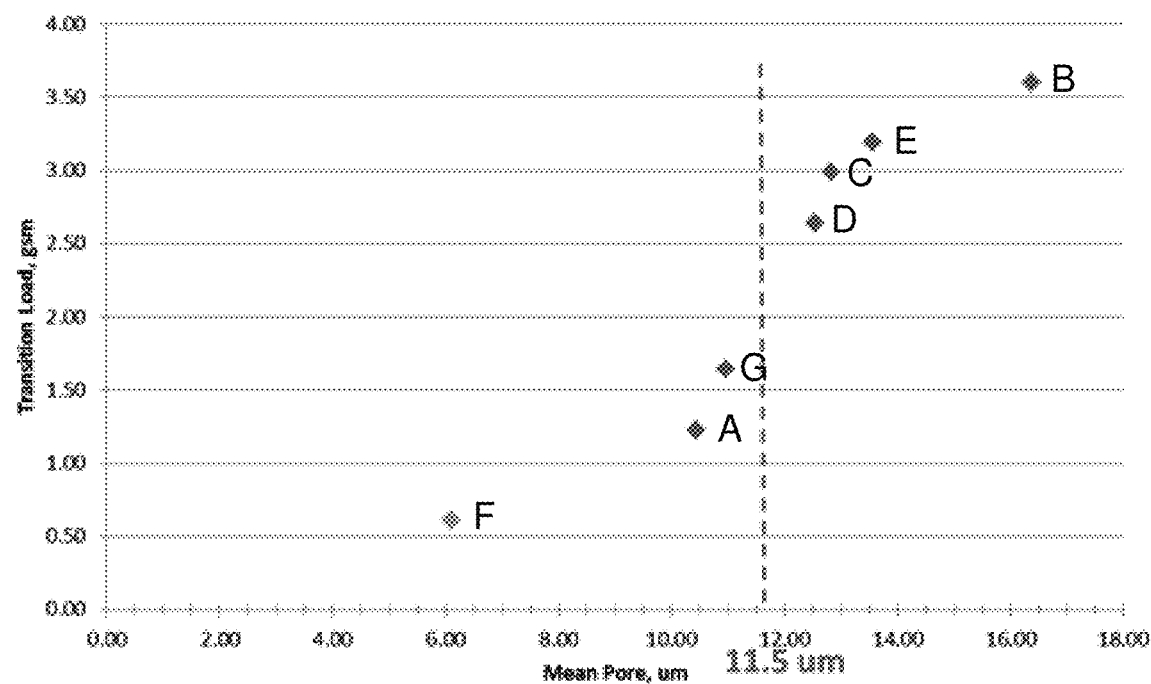
FIG. 2B is a plot showing transition salt loading versus mean flow pore size for various fiber filtration layers.

FIG. 2B shows a plot of the transition salt load for Samples A-G as a function of mean flow pore size. As shown, the samples having a mean flow pore size of greater than 11.5 microns had a significantly higher transition salt load than the samples having a mean flow pore size of less than 11.5 microns. Higher transition salt loads are generally correlated with improved filtration performance in high humidity conditions, as well as standard conditions.

Figure 2C:
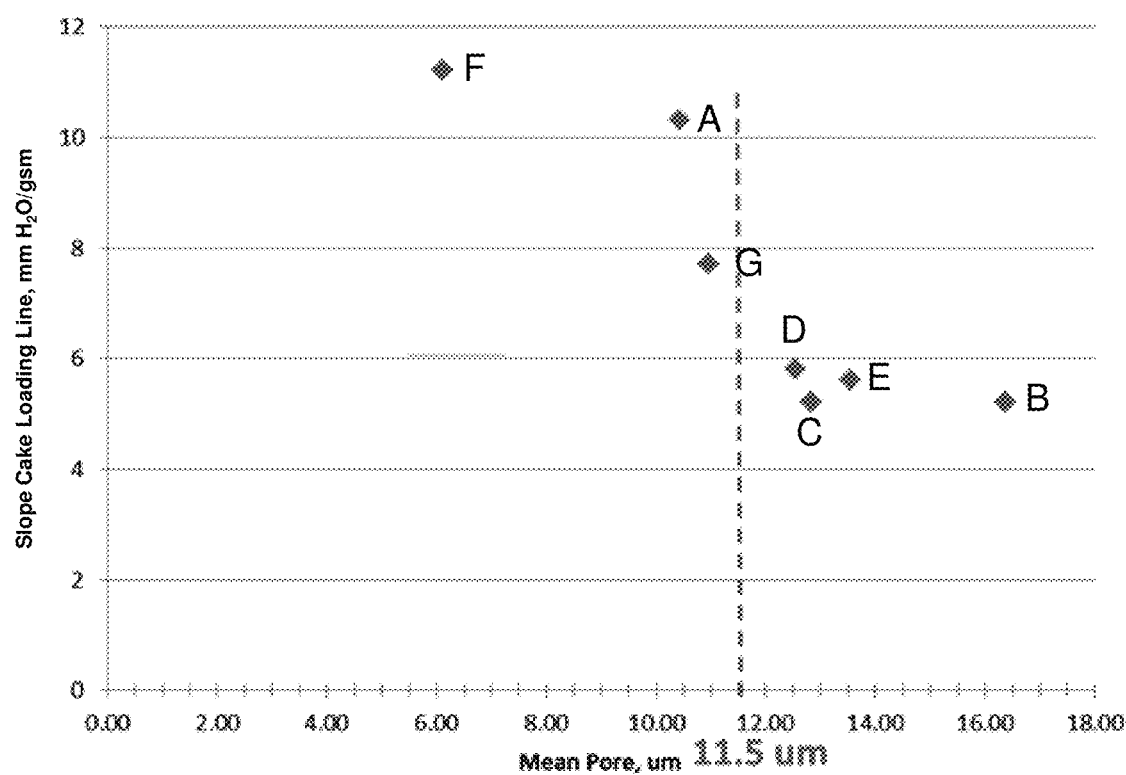
FIG. 2C is a plot showing cake pressure slope versus mean flow pore size for various fiber filtration layers.

FIG. 2C shows a plot of the slope of the cake loading line versus mean flow pore size for Samples A-G. As shown, the samples having a mean flow pore size of greater than 11.5 microns had lower slopes of the cake loading line than samples having a mean flow pore size of less than 11.5 microns. The lower slopes can lead to higher transition salt loads which generally are correlated with improved high humidity filtration performance.

FIGS. 2B-2C demonstrate that fiber filtration layers having a minimum DEHS efficiency of at least 25% and a mean flow pore size of at least about 11.5 microns had significantly increased transition salt loads as compared to fiber filtration layers at this efficiency with less than 11.5 micron mean flow pore sizes. Since high transition salt loads are generally correlated with improved high humidity performance, the fiber filtration layers having a mean flow pore size of at least about 11.5 microns are expected to have improved filtration performance in high humidity environments.

Figure 3A:
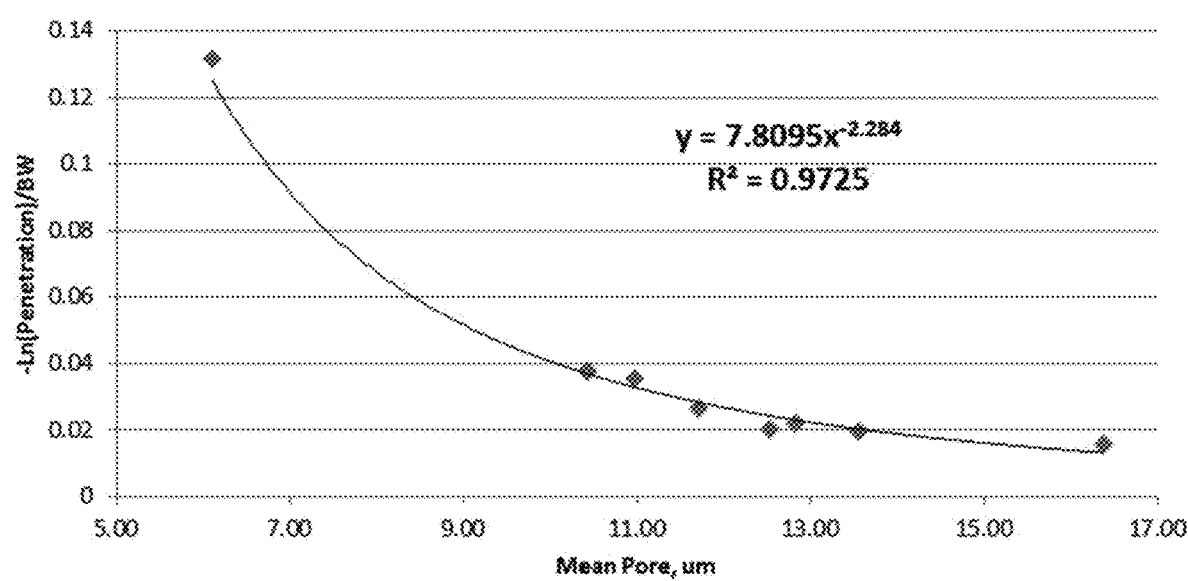
FIG. 3A is a plot the specific natural log of penetration (i.e., the natural log of the penetration divided by the basis weight) versus mean flow pore size for various fiber filtration layers.

FIG. 3A is a plot of the specific natural log of penetration (i.e., the natural log of the penetration divided by the basis weight) versus mean flow pore size for Samples A-G. The regression curve shown on the plot demonstrates a relationship between fiber filtration layer mean flow pore size, fiber filtration layer basis weight and penetration. Therefore, there is also a relationship between fiber filtration layer mean flow pore size, fiber filtration layer basis weight and efficiency. For example, the following equation has been derived, in part from the latter relationship, to identify suitable mean pore size and basis weight values needed to obtain a target minimum DEHS efficiency.

$$BW > -\frac{MP^2(\mathrm{Ln}(1-E))}{6.5}$$

where BW is the basis weight of the fiber filtration layer, MP is the mean flow pore size, and E is the minimum DEHS efficiency for the fiber filtration layer that is being targeted.

Figure 3B:
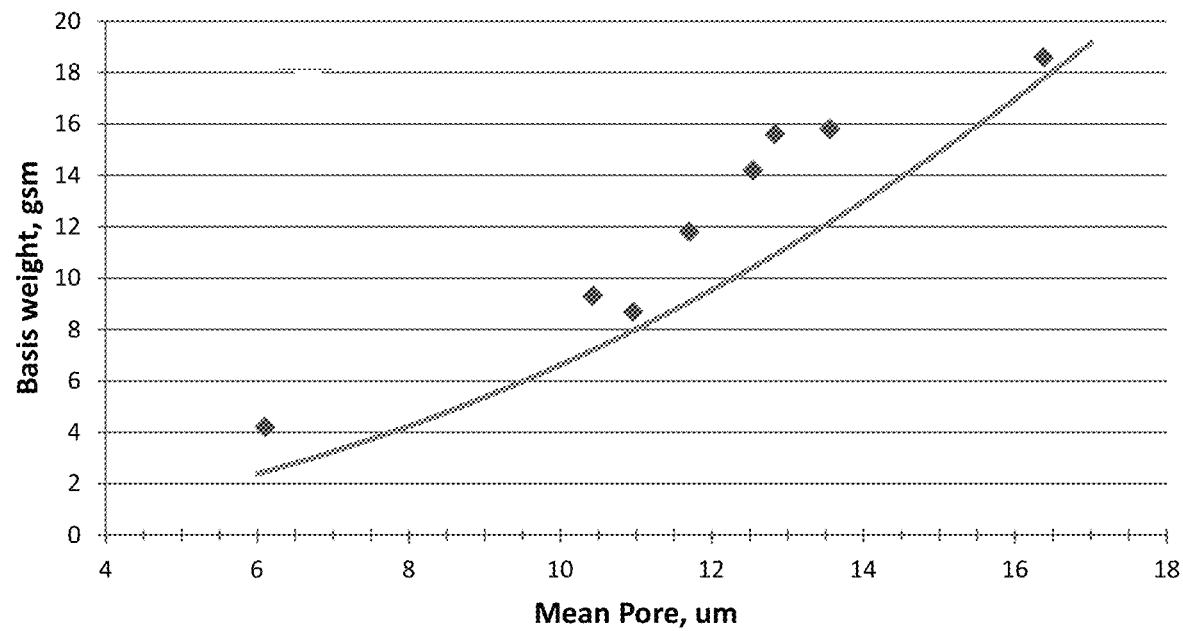
FIG. 3B is a plot showing basis weight versus mean flow pore size for various fiber filtration layers.

FIG. 3B is a plot of the basis weight (gsm) versus mean flow pore size for Samples A-G. The relationship above is used to define the curve which is a boundary of the basis weight and mean flow pore size values at which a minimum DEHS efficiency of 35% (to meet F7 classification) is met. Fiber filtration layers having combinations of basis weight and mean flow pore size that lie on or above the boundary have a minimum DEHS efficiency of 35% or greater. The fiber filtration layers having a mean flow pore size of greater than 11.5 microns and lie on or above the boundary also have improved high humidity performance, as noted above.

Example 2

This example demonstrates the correlation between performance of a filter media and mean flow pore size under humid conditions.

Filter media samples including a range of mean pore sizes (from about 10 microns to 16.5 microns) were tested in a humid environment. The filter media samples included a fiber filtration layer between two support layers with the combined layers being in a waved configuration. The testing followed the protocol described above to measure the percent decrease in air permeability after humidity loading.

Figure 4:
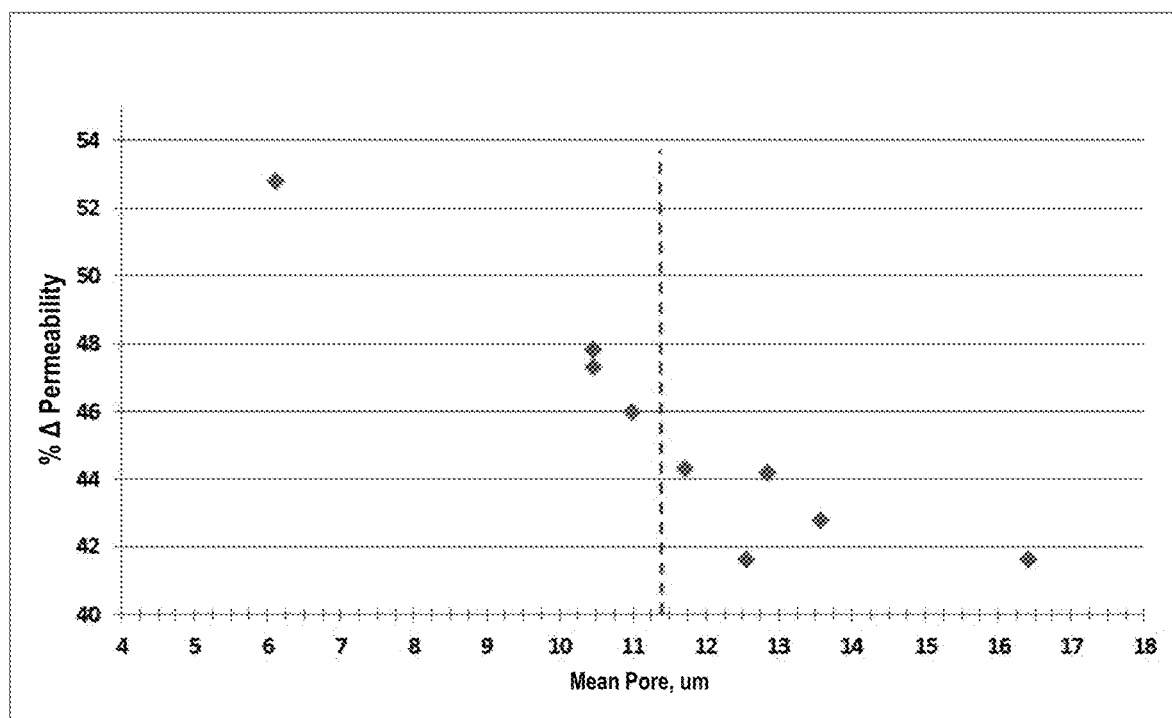
FIG. 4 is a plot showing the percentage difference between the maximum air permeability minus the minimum air permeability value expressed as a percentage of the maximum value versus mean flow pore size for various filter media in a humid environment.

As noted in the protocol described above, the percent decrease in air permeability after humidity loading is the difference between the maximum air permeability (as measured during the testing) minus the minimum air permeability (as measured during the testing at 90% humidity) expressed as a percentage of the maximum air permeability value. FIG. 4 shows a plot of the difference versus mean flow pore size. As shown on the plot, for mean flow pore sizes greater than about 11.5 microns, the average difference was about 44% or less. For mean flow pore sizes less than 11.5 microns, the average difference was 46% or greater.

This data shows that filter media including mean flow pore sizes of greater than 11.5 microns experience smaller differences between maximum air permeability and minimum air permeability than filter media including mean flow pore sizes of less than 11.5 microns.

Example 3

This example demonstrates the modification of a filter media to enhance the hydrophilicity of at least a surface of a layer of the filter media. Filter media samples were tested in a humid environment. The filter media samples included a fiber filtration layer between two support layers with the combined layers being in a waved configuration. The testing followed the protocol described above to measure the decrease in air permeability after humidity loading (at 95% humidity).

Figure 5:
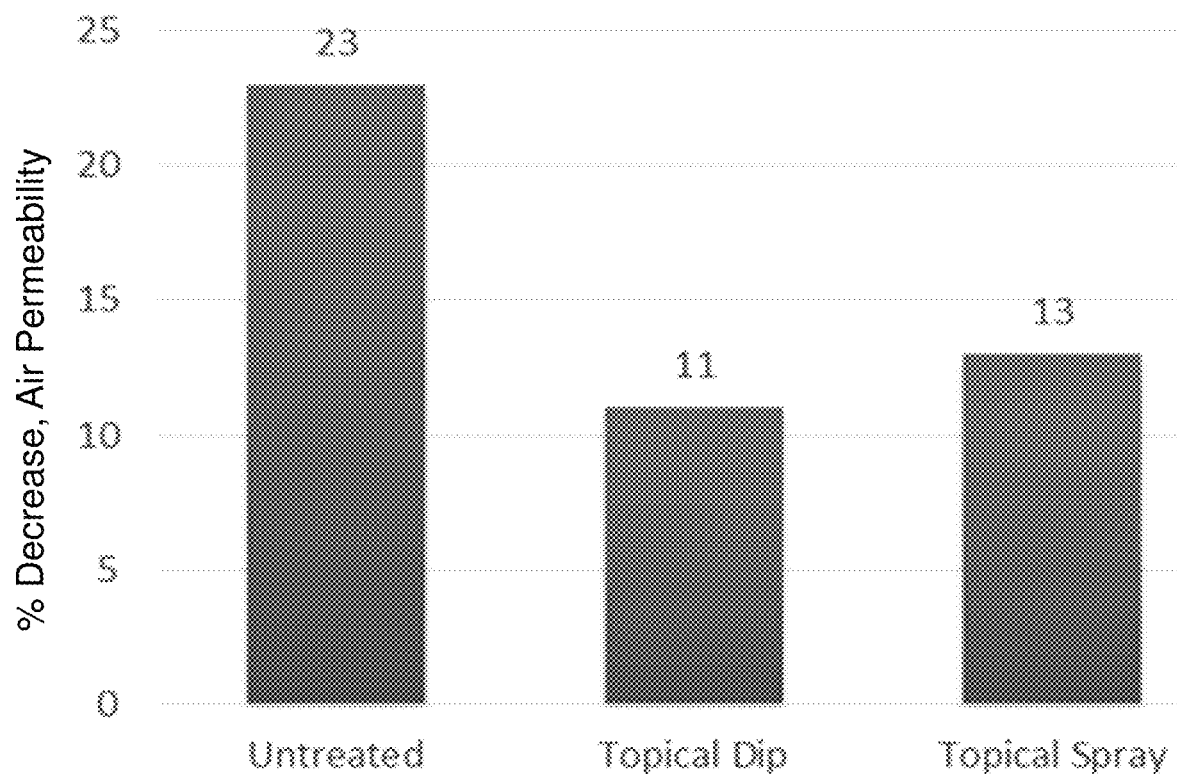
FIG. 5 is a plot showing the percent decrease in air permeability after humidity loading versus the type of hydrophilic treatment for various filter media.

Two samples were treated with a surfactant (e.g., one using a topical dip and one using a topical spray) before loading and humidity and the third sample left untreated, as indicated in FIG. 5. The percent decrease in air permeability after humidity loading (at 95% humidity) is plotted in FIG. 5. The topical dip and topical spray of waved samples with hydrophilic treatments comprising a surfactant showed a lower decrease in pressure drop as compared to untreated waved samples.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A filter media, comprising:
a fiber filtration layer and a support layer that holds the fiber filtration layer in a waved configuration and maintains separation of peaks and troughs of adjacent waves of the fiber filtration layer,
wherein at least a surface of the fiber filtration layer is hydrophilic, having a water contact angle of less than or equal to 60 degrees.

2. A filter media, comprising:
a fiber filtration layer and a support layer that holds the fiber filtration layer in a waved configuration and maintains separation of peaks and troughs of adjacent waves of the fiber filtration layer,
wherein at least a surface of the fiber filtration layer is hydrophilic, and
wherein the filter media has a decrease in air permeability of less than or equal to 20% after humidity loading at 95%.

3. A filter media as in claim 1, wherein the fiber filtration layer comprises hydrophilic fibers.

4. A filter media as in claim 1, wherein the fiber filtration layer has a mean flow pore size of at least about 5 microns.

5. A filter media as in claim 1, wherein the support layer has a density that is greater at the peaks than a density in the troughs.

6. A filter media as in claim 1, wherein the filter media has a minimum DEHS particle filtration efficiency of at least about 25%.

7. A filter media as in claim 1, wherein the fiber filtration media comprises a coating.

8. A filter media as in claim 7, wherein the coating comprises a polymeric coating selected from the group consisting of acrylate, carboxylic acid, sulfonate, polyol, amine, a silicon-containing compound, and combinations thereof.

9. A filter media as in claim 1, wherein the fiber filtration layer comprises a wetting agent.

10. A filter media as in claim 9, wherein the wetting agent is a surfactant.

11. A filter media as in claim 10, wherein the surfactant is selected from the group consisting of anionic surfactants, nonionic surfactants, cationic surfactants, amphoteric surfactants, and combinations thereof.

12. A filter media as in claim 7, wherein the coating is present in the fiber filtration layer in an amount greater than or equal to about 0.0001 wt % and less than about 5 wt % versus the total weight of the layer.

13. A filter media as in claim 1, wherein the fiber filtration layer comprises a melt additive.

14. A filter media as in claim 13, wherein the melt additive is selected from the group consisting of monoglycerides, mixed glycerides, di-fatty acid esters of polyethylene oxide, ethoxylated castor oil, blends of glycerol oleate esters and alkyl phenol ethoxylates, polyethylene glycol esters of fatty acids, and preblended masterbatch melt additives.

15. A filter media as in claim 14, wherein the weight percent of the melt additive used to modify at least one surface of the layer is greater than or equal to about 0.0001 wt % and less than about 10 wt % versus the total weight of the layer.

16. A filter media as in claim 1, wherein the filter media has a decrease in air permeability of less than or equal to 20% after humidity loading at 95%.

17. A filter media as in claim 1, wherein the support layer is formed from fibers having an average fiber diameter that is greater than or equal to an average fiber diameter of the fiber filtration layer.

18. A filter media as in claim 1, wherein the basis weight of the fiber filtration layer is selected such that:

$$BW > \frac{-MP^a \ln(1-E)}{b}$$

wherein:
BW is the basis weight of the fiber filtration layer in grams per meter squared;
MP is the mean pore size of the fiber filtration layer in microns;
E is the minimum DEHS efficiency of the fiber filtration layer expressed as a fraction;
a is equal to 2; and
b is equal to 6.5.

19. A filter media as in claim 1, wherein the support layer comprises fibers having an average fiber diameter of between about 10 microns to 32 microns.

20. A filter media as in claim 1, wherein the filter media comprises a second support layer having an average fiber diameter of between about 10 microns to 32 microns.

21. A filter media as in claim 1, wherein the filter media further comprises at least one cover layer disposed on the support layer.

22. A filter media as in claim 1, wherein the fiber filtration layer comprises fibers having an average fiber diameter of between about 0.2 micron and about 10 microns.

23. A filter media as in claim 1, wherein the fiber filtration layer has a mean flow pore size of at least about 11.5 microns.

24. A filter media as in claim 1, wherein the fiber filtration layer has a basis weight of greater than or equal to about 10 g/m² and less than or equal to about 40 g/m².

25. A filter media as in claim 1, wherein the fiber filtration layer has a basis weight of greater than or equal to about 13 g/m² and less than or equal to about 20 g/m².

26. A filter media as in claim 1, wherein the fiber filtration layer has a slope of a cake loading line of between 1 mm H₂O/gsm salt load per sample and about 7 mm H₂O/gsm salt load per sample.

27. A filter media as in claim 1, wherein the fiber filtration layer has a thickness in the range of about 6 mils to 22 mils.

28. A filter media as in claim 1, wherein the fiber filtration layer has an air permeability in the range of about 30 CFM to 150 CFM, as measured according to ASTM F778-88.

29. A filter media as in claim 1, wherein the fiber filtration layer has a surface area of at least about 0.8 grams per square meter.

30. A filter media as in claim 1, wherein the fiber filtration layer has an amplitude of the peaks and troughs of between about 0.1" to 4.0".

31. A filter media as in claim 1, wherein the fiber filtration layer has a solidity between about 1% and about 20%.

32. A filter media as in claim 1, wherein the filter media has a minimum DEHS particle filtration efficiency of at least about 35%.

33. A filter media as in claim 1, wherein the fiber filtration layer in the waved configuration is formed from a fiber layer having a planar configuration and a transition salt load of at least about 3.5 gsm.

34. A method for forming a filter media, comprising:
modifying the hydrophilicity of at least one surface of a fiber filtration layer of the filter media such that the filter media has a decrease in air permeability of less than or equal to 20% after humidity loading at 95%,
wherein the at least one surface of the fiber filtration layer is hydrophilic and wherein the filter media comprises a support layer that holds the fiber filtration layer in a waved configuration and maintains separation of peaks and troughs of adjacent waves of the fiber filtration layer.

* * * * *